US009363294B2

(12) United States Patent
Ozawa et al.

(10) Patent No.: US 9,363,294 B2
(45) Date of Patent: Jun. 7, 2016

(54) MANAGEMENT SERVER, TENANT PATTERN VALIDATION METHOD, AND COMPUTER SYSTEM

(71) Applicant: Hitachi, Ltd., Tokyo (JP)

(72) Inventors: Yoji Ozawa, Tokyo (JP); Yukio Ogawa, Tokyo (JP); Yoshiko Yasuda, Tokyo (JP); Yosuke Himura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 193 days.

(21) Appl. No.: 14/100,676

(22) Filed: Dec. 9, 2013

(65) Prior Publication Data

US 2014/0165136 A1 Jun. 12, 2014

(30) Foreign Application Priority Data

Dec. 10, 2012 (JP) .................................. 2012-269453

(51) Int. Cl.
G06F 15/177 (2006.01)
H04L 29/06 (2006.01)
H04L 12/24 (2006.01)

(52) U.S. Cl.
CPC .......... *H04L 63/205* (2013.01); *H04L 41/0873* (2013.01)

(58) Field of Classification Search
CPC .......................... H04L 63/205; H04L 41/0873
USPC ......................................... 709/204, 220, 226
See application file for complete search history.

(56) References Cited

U.S. PATENT DOCUMENTS 7,321,926 B1 * 1/2008 Zhang ................... G06F 9/5033
455/453
2003/0016770 A1 * 1/2003 Trans ....................... H04B 1/00
375/346

(Continued)

FOREIGN PATENT DOCUMENTS

JP 06-314278 A 11/1994
JP 2001-094559 A 4/2001

(Continued)

OTHER PUBLICATIONS

Yoji Ozawa et al. "Tenant Pattern Based Provisioning Method for Data Center Network". IEICE Technical Report, ICM2011-48-ICM2011-75 Information and Communication Management. Mar. 8, 2012. vol. 110 No. 488 pp. 41-46.

(Continued)

*Primary Examiner* — Thu Ha Nguyen
(74) *Attorney, Agent, or Firm* — Volpe and Koenig, P.C.

(57) ABSTRACT

A management server which manages a tenant pattern being information for forming a tenant being an application system for executing a predetermined application by using computer resources within a computer system, the tenant pattern including a configuration item and an ID pool, the management server having: pattern parts information for managing the configuration item as a pattern part that forms the tenant pattern; validation rule information for storing a detail of validation processing for a composition of the tenant pattern; and the management server further comprising: a tenant pattern generation unit; a tenant designing unit for designing a composition of the tenant, and generating a configuration detail for actually building the tenant on the computer system; and a validation execution unit for executing the validation processing for the tenant pattern and the configuration detail based on the validation rule information.

20 Claims, 30 Drawing Sheets

(56) References Cited

U.S. PATENT DOCUMENTS

| | | |
|---|---|---|
| 2005/0198248 A1 | 9/2005 | Morimoto et al. |
| 2006/0156209 A1 | 7/2006 | Matsuura et al. |
| 2007/0045408 A1 | 3/2007 | Ogishima et al. |
| 2007/0299889 A1 | 12/2007 | Shozaki et al. |
| 2008/0010554 A1 | 1/2008 | Gonguet et al. |
| 2009/0178110 A1 | 7/2009 | Higuchi |
| 2010/0095064 A1* | 4/2010 | Aviles ............... H04L 67/2852 711/118 |
| 2010/0174939 A1* | 7/2010 | Vexler ............... G06F 17/3048 714/5.1 |
| 2010/0250497 A1* | 9/2010 | Redlich ............... F41H 13/00 707/661 |
| 2011/0131335 A1* | 6/2011 | Spaltro ............... G06F 9/5072 709/228 |
| 2012/0060165 A1* | 3/2012 | Clarke ............... G06F 9/5038 718/104 |
| 2013/0046906 A1* | 2/2013 | Ripberger ............... G06F 3/0629 710/12 |
| 2013/0111036 A1* | 5/2013 | Ozawa ............... H04L 41/0893 709/226 |
| 2014/0040343 A1* | 2/2014 | Nickolov ............... G06F 9/4856 709/201 |
| 2014/0215141 A1* | 7/2014 | Leon ............... H03K 19/173 711/106 |
| 2014/0280595 A1* | 9/2014 | Mani ............... H04L 65/403 709/204 |

FOREIGN PATENT DOCUMENTS

| | | |
|---|---|---|
| JP | 2005-234705 A | 9/2005 |
| JP | 2006-012144 A | 1/2006 |
| JP | 2006-121692 A | 5/2006 |
| JP | 2007-065957 A | 3/2007 |
| JP | 2007-312044 A | 11/2007 |
| JP | 2008-171318 A | 7/2008 |
| JP | 2012-221037 A | 11/2012 |
| JP | 2012-227787 A | 11/2012 |
| WO | 2007/100045 A1 | 9/2007 |

OTHER PUBLICATIONS

Yoshiko Yasuda et al. "Proposal of Auto Designing Method for Data Center Cloud Network". FIT 2011 Forum on Information Technology 2011, Lecture Collected Papers. Information Processing Society of Japan. Aug. 22, 2011. pp. 201-202.

* cited by examiner

PERFORMANCE REQUIREMENT CHECK SCENARIO INFORMATION

| ID | PERFORMANCE REQUIREMENT | COMMAND | RESPONSE STRING |
|---|---|---|---|
| 2 | CPU LOAD | Show cpu minutes | [A-Z][a-z]{2} [0-9]{2} [0-9]{2}:[0-9]{2}:[0-9]{2}-[0-9]{2} [0-9]{2}:[0-9]{2}:[0-9]{2} ([0-9]+) |

Fig. 3

EXTRACTION STRING INFORMATION

| ID | EXTRACTION STRING | |
|---|---|---|
| 2 | VRF MODE IPv4 | VALUE RANGE (VALUE 1) TO (VALUE 2) |

Fig. 4

PATTERN PARTS INFORMATION (CONFIGURATION ITEM) 523

| PATTERN PARTS ID 52301 | NODE 52302 | MUL-TIPLICITY 52303 | CONFIGURATION ITEM 52304 | CONFIGURATION ORDER 52305 | PARAMETER ID 52306 | PARAMETER 52307 | DETERMINATION METHOD 52308 | PARAMETER TYPE TAG 52309 | COMMAND TEMPLATE 52310 |
|---|---|---|---|---|---|---|---|---|---|
| PART 1 | - | - | ACL | 1 | PARAMETER 101 | ACL ID | POOL (DESIGNATE POOL TO BE USED IN PATTERN GENERATION) | - | |
| | | | | | PARAMETER 102 | TRANSMISSION SOURCE | FIXED (Any) | - | ADD: #1 |
| | | | | | PARAMETER 103 | DESTINATION | REFER | - | DELETE: #2 |
| | | | | | PARAMETER 104 | PROTOCOL | DESIGNATED BY USER | - | |
| | | | | | PARAMETER 105 | ACTION | FIXED (Permit) | - | |
| PART 2 | - | - | VRF | 1 | PARAMETER 201 | VRF ID | POOL (DESIGNATE POOL TO BE USED IN PATTERN GENERATION) | - | ADD: #1 |
| | | | | | PARAMETER 202 | OPERATION MODE | FIXED (IPv4) | - | DELETE: #2 |
| PART 3 | - | - | LOAD BALANCING | 1 | PARAMETER 301 | ASSIGNED IP | REFER | - | ADD: #3 |
| | | | | | PARAMETER 302 | MONITORING METHOD | FIXED (ICMP) | - | DELETE: #4 |
| PART 4 | VM | *(2) | IP ADDRESS | 1 | PARAMETER 401 | IP ADDRESS | POOL 1 | PUBLIC SERVER IP | ADD: #3 |
| | | | HOST NAME | 2 | PARAMETER 402 | HOST NAME | REFER | - | DELETE: #4 |

Fig. 5

PATTERN PARTS INFORMATION (POOL)

| PATTERN PARTS ID | POOL NAME | KIND | POOL RESOURCE |
|---|---|---|---|
| POOL 1 | IP ADDRESS 1 | IP ADDRESS | NETWORK ADDRESS : 10.0.0.0/16<br>DEFAULT MASK LENGTH : 26 |
| POOL 2 | VLAN ID | ID | MINIMUM ID-MAXIMUM ID : 10-100, 1000-4000 / 1000-4000 |
| POOL 3 | POLICY ID | ID | MINIMUM ID-MAXIMUM ID : 200—1500 |
| POOL 4 | ACL ID | ID | MINIMUM ID-MAXIMUM ID : 10-10000 |

Fig. 6

VALIDATION RULE INFORMATION

| VALIDATION RULE ID | VALIDATION RULE KIND | VALIDATION RULE DETAIL | VALIDATION TARGET | DEVICE INFORMATION ||
|---|---|---|---|---|---|
| | | | | MODEL | PARAMETER VALUE |
| 1 | PARAMETER VALUE RANGE | FW POLICY ID HAS RANGE | PARAMETER 101 | J1 | 1~4,000 |
| | | | | J2 | 1~200 |
| 2 | UPPER LIMIT OF THE NUMBER OF INSTANCES | 1. VRF HAS UPPER LIMIT | PART 2 | A1 | UPPER LIMIT VALUE 1 (PRECONDITION1PRESENT, PRECONDITION2PRESENT)=20 (PRECONDITION1PRESENT, PRECONDITION2ABSENT)=35 (PRECONDITION1ABSENT, PRECONDITION2PRESENT)=40 (PRECONDITION1ABSENT, PRECONDITION2ABSENT)=50 UPPER LIMIT VALUE 2 (PRECONDITION1PRESENT, PRECONDITION2PRESENT)=150 (PRECONDITION1PRESENT, PRECONDITION2ABSENT)=200 (PRECONDITION1ABSENT, PRECONDITION2PRESENT)=210 (PRECONDITION1ABSENT, PRECONDITION2ABSENT)=250 |
| 3 | PARAMETER VALUE REFERENCE | 1. TRANSMISSION DESTINATION IP OF LB HAS REFERENCE 2. REFERENTIAL TARGET IS "PUBLIC SERVER IP" | PARAMETER 301 | - | - |
| 4 | CONFIGURATION ORDER | ·CONFIGURATION ITEM A PRECEDES CONFIGURATION ITEM B IN CONFIGURATION ORDER ·CONFIGURATION ITEM A : 「VRF」 ·CONFIGURATION ITEM B : ASSOCIATE VRF WITH VLAN ·CONFIGURATION ITEM | - | - | - |
| 5 | COMPOSITION ASSUMPTION | "ACL" HAS PRECONDITION OF "COMMON ZONE" | PART 1 | - | - |
| 10 | UPPER LIMIT OF THE NUMBER OF INSTANCES | 1. VRF HAS UPPER LIMIT | PART 10 | C1 | UPPER LIMIT VALUE 1=40 UPPER LIMIT VALUE 2=200 |

Fig. 7

VALIDATION RULE DETAIL INFORMATION (UPPER LIMIT VALUE)

5252

| VALIDATION RULE ID (52521) | PERFORMANCE REQUIREMENT (52522) | PRECONDITION ID (52523) | CONDITIONAL CONFIG ITEM (SPECIFIC VALUE) (52524) | CONDITIONAL CONFIG ITEM (CALCULATION) (52525) |
|---|---|---|---|---|
| 2 | REQUIREMENT1) CPU50% OR LESS: UPPER LIMIT VALUE1 REQUIREMENT2) CPU80%OR LESS: UPPER LIMIT VALUE2 | 1 | CONFIGURATION ITEM: "OSPF" | - |
| | | 2 | CONFIGURATION ITEM: "MULTICAST" | - |
| 10 | CPU50%OR LESS: UPPER LIMIT VALUE1 CPU80%OR LESS: UPPER LIMIT VALUE2 | 1 | - | IN CASE WHERE CONFIGURATION ITEM "OSPF" IS PRESENT: BASIC UPPER LIMIT VALUEx0.5 IN CASE OF ABSENT BASIC UPPER LIMIT VALUEx1.0 |

Fig. 8

VALIDATION RULE DETAIL INFORMATION (COMPOSITION ASSUMPTION)

5253

| VALIDATION RULE ID (52531) | TARGET COMPOSITION (52532) | CHECK COMMAND (52533) | RESPONSE STRING (52534) |
|---|---|---|---|
| 5 | COMMON ZONE | get zone | Trust |

TENANT PATTERN INFORMATION 528

| | | | | | | |
|---|---|---|---|---|---|---|
| 52813 | COMMAND TEMPLATE | ADD: #1 DELETE: #2 | | | | |
| 52812 | APPLICATION FLOW | ·CHANGE ACL (ADD) · ADD VM (ADD) | | | | |
| 52811 | PARAMETER TYPE TAG | - | - | - | - | - |
| 52810 | DETERMINATION METHOD | POOL4 (FROM LOW NUMBER) | FIXED (Any) | REFER (NETWORK ADDRESS OF SUBNET 3) | DESIGNATED BY USER | FIXED (Permit) |
| 52809 | PARAMETER | ACL ID | TRANSMISSION SOURCE | DESTINATION | PROTOCOL | ACTION |
| 52808 | UPPER LIMIT VALUE OF THE NUMBER OF INSTANCES | - | | | | |
| 52807 | PATTERN PARTS ID | PART 1 | | | | |
| 52806 | CONFIGURATION ORDER | 1 | | | | |
| 52805 | CONFIGURATION ITEM TYPE TAG | - | | | | |
| 52804 | CONFIGURATION ITEM | ACL | | | | |
| 52803 | MULTIPLICITY | - | | | | |
| 52802 | NODE | FW1 | | | | |
| 52801 | TENANT PATTERN ID | 1 | | | | |

Fig. 10B

TENANT PATTERN INFORMATION

| | | | | | | |
|---|---|---|---|---|---|---|
| 52801 TENANT PATTERN ID | 1 | | 1 | | 1 | |
| 52802 NODE | CORE SW1 | | | | VM1 | MANAGEMENT INFORMATION |
| 52803 MULTIPLICITY | | | | | *(3) | |
| 52804 CONFIGURATION ITEM | VRF | | ASSOCIATE VRF WITH VLAN | | IP ADDRESS | |
| 52805 CONFIGURATION ITEM TYPE TAG | VRF | | | | | |
| 52806 CONFIGURATION ORDER | 1 | | 2 | | 1 | |
| 52807 PATTERN PARTS ID | PART 2 | | | | PART 4 | |
| 52808 UPPER LIMIT VALUE OF THE NUMBER OF INSTANCES | 40 | | | | | |
| 52809 PARAMETER | VRF ID | OPERATION MODE | VRF ID | VLAN ID | IP ADDRESS | TENANT ID |
| 52810 DETERMINATION METHOD | POOL 8 | FIXED (IPv4) | REFER (VRF ID OF CONFIGURATION ITEM "VRF") | REFER (VLAN ID OF SUBNET 3) | POOL 3 (FROM LOW NUMBER) | POOL 7 (FROM LOW NUMBER) |
| 52811 PARAMETER TYPE TAG | - | - | - | - | PUBLIC SERVER IP | - |
| 52812 APPLICATION FLOW | - | - | - | - | - | - |
| 52813 COMMAND TEMPLATE | ADD: #3 DELETE: #4 | | ADD: #5 DELETE: #6 | | - | - |

528

TENANT PATTERN INFORMATION (SUBNET)

| TENANT PATTERN ID | SUBNET ID | VLAN ID POOL | MEMBER NODE | ADDRESS POOL |
|---|---|---|---|---|
| 1 | 1 | POOL 4 | ROUTER 1<br>FW1<br>FW2 | POOL 1 |
| 1 | 2 | POOL 4 | FW1<br>FW2<br>CORE SW1<br>CORE SW2 | POOL 2 |
| 1 | 3 | POOL 5 | CORE SW1<br>CORE SW2<br>VM1 | POOL 3 |
| 1 | 4 | POOL 5 | CORE SW1<br>CORE SW2<br>VM2 | POOL 3 |

Fig. 11

MAPPING INFORMATION

| TENANT PATTERN ID | NODE | PHYSICAL DEVICE | NODE VIRTUALIZATION |
|---|---|---|---|
| 1 | ROUTER 1 | "A" COMPANY ROUTER 1 | - |
| 1 | FW1 | "A" COMPANY FW1 | - |
| 1 | FW2 | "A" COMPANY FW2 | - |
| 1 | CORE SW1 | "A" COMPANY CORE SW1 | - |
| 1 | CORE SW2 | "A" COMPANY CORE SW2 | - |
| 1 | VM1 | PHYSICAL SERVER 1 | O |
| 1 | VM2 | PHYSICAL SERVER 2 | O |

Fig. 12

ID POOL INFORMATION 531

| | 5311 | 5312 | 5313 | 5314 |
|---|---|---|---|---|
| | ID | POOL NAME | KIND | POOL RESOURCE |
| | 1 | IP ADDRESS 1 | IP ADDRESS | NETWORK ADDRESS : 10.0.0.0/16 DEFAULT MASK LENGTH : 26 |
| | 2 | IP ADDRESS 2 | IP ADDRESS | NETWORK ADDRESS : 10.0.0.0/16 DEFAULT MASK LENGTH : 26 |
| | 3 | IP ADDRESS 3 | IP ADDRESS | NETWORK ADDRESS : 10.0.0.0/16 DEFAULT MASK LENGTH : 24 |
| | 4 | VLAN ID FOR CORE | ID | MINIMUM ID — MAXIMUM ID : 100-10000 |
| | 5 | VLAN ID FOR EDGE | ID | MINIMUM ID — MAXIMUM ID : 1001-3000 |
| | 6 | ACL ID | ID | MINIMUM ID — MAXIMUM ID : 10-10000 |
| | 7 | TENANT ID | ID | MINIMUM ID — MAXIMUM ID : 1-1000 |
| | 8 | VRF IF | ID | MINIMUM ID — MAXIMUM ID : 2-250 |

Fig. 13

COMMAND TEMPLATE INFORMATION 532

| 5321 | 5322 | 5323 |
|---|---|---|
| ID | NAME | COMMAND TEMPLATE |
| 1 | ADD ACL | set policy id <ID> from <TRANSMISSION SOURCE> to <DESTINATION> <PROTOCOL> <ACTION> |
| 2 | DELETE ACL | unset policy id <ID> |
| 3 | SET IP ADDRESS FOR VLAN IF | interface vlan <CONFIGURATION TARGET VLAN ID> ip address <IP ADDRESS> |
| : | : | : |

Fig. 14

TENANT INSTANCE INFORMATION (NODE)

| TENANT INSTANCE ID | NODE | NODE INSTANCE | CONFIGURATION ITEM | PARAMETER | PARAMETER VALUE |
|---|---|---|---|---|---|
| 1-1 | FW1 | FW1 | ACL | ACL ID | 10 |
|  |  |  |  | TRANSMISSION SOURCE | Any |
|  |  |  |  | DESTINATION | 10.10.0.0/24 |
|  |  |  |  | PROTOCOL | http |
|  |  |  |  | ACTION | Permit |
| 1-1 | CORE SW 1 | CORE SW 1 | VRF | VRF ID | 2 |
|  |  |  |  | OPERATION MODE | IPv4 |
| 1-1 | VM1 | tVM1-1 | IP ADDRESS | IP ADDRESS | 10.10.0.4/24 |
| 1-1 | VM1 | tVM1-2 | IP ADDRESS | IP ADDRESS | 10.10.0.5/24 |
| 1-1 | VM1 | tVM1-3 | IP ADDRESS | IP ADDRESS | 10.10.0.6/24 |
| 1-1 | MANAGEMENT INFORMATION | MANAGEMENT INFORMATION | - | TENANT ID | 1 |

Fig. 15

TENANT INSTANCE INFORMATION (SUBNET)

| TENANT INSTANCE ID 53321 | SUBNET ID 53322 | VLAN ID 53323 | MEMBER NODE 53324 | NETWORK ADDRESS 53325 |
|---|---|---|---|---|
| 1-1 | 1 | 100 | ROUTER 1-1<br>ROUTER 1-2<br>FW1<br>FW2 | 10.0.0.0/26 |
| 1-1 | 2 | 101 | FW1<br>FW2<br>CORE SW 1<br>CORE SW 2 | 10.1.0.0/26 |
| 1-1 | 3 | 1001 | CORE SW 1<br>CORE SW 2<br>tVM1-1<br>tVM1-2<br>tVM1-3 | 10.10.0.0/24 |
| 1-1 | 4 | 1002 | CORE SW 1<br>CORE SW 2<br>tVM2-1 | 10.10.1.0/24 |

TENANT INSTANCE INFORMATION (MAPPING)

| TENANT INSTANCE ID 53331 | NODE INSTANCE 53332 | MAPPED PHYSICAL DEVICE 53333 |
|---|---|---|
| 1-1 | ROUTER 1-1 | ROUTER 1 |
| 1-1 | ROUTER 1-2 | ROUTER 2 |
| 1-1 | FW1 | FW1 |
| 1-1 | FW2 | FW2 |
| 1-1 | CORE SW 1 | CORE SW 1 |
| 1-1 | CORE SW 2 | CORE SW 2 |
| 1-1 | tVM1-1 | VM1-1 (PHYSICAL SERVER 1, VIRTUAL SW 1-1) |
| 1-1 | tVM1-2 | VM1-2 (PHYSICAL SERVER 1, VIRTUAL SW 1-1) |
| 1-1 | tVM1-3 | VM2-1 (PHYSICAL SERVER 1, VIRTUAL SW 2-1) |
| 1-1 | tVM2-1 | VM3-1 (PHYSICAL SERVER 3, VIRTUAL SW 3-1) |

PHYSICAL TOPOLOGY INFORMATION

| DEVICE | MODEL | MANAGEMENT IP ADDRESS | TELNET ACCOUNT |
|---|---|---|---|
| ROUTER 1 | A1 | 172.16.0.1 | operator/passwd |
| CORE SW 1 | C1 | 172.16.0.5 | operator/passwd |
| FW1 | J1 | 172.16.0.10 | operator/passwd |
| PHYSICAL SERVER 1 | B1 | 172.16.0.100 | admin/admin |
| VIRTUAL SW 1 | - | - | - |
| VM1-1 | - | - | - |
| : | | : | |

Fig. 18

DESIGN AND CONFIGURATION TASK INFORMATION

| ID | DESIGN DATE/TIME | DESIGN DETAIL | USED TENANT PATTERN | TENANT INSTANCE ID | CONFIGURATION DETAIL |
|---|---|---|---|---|---|
| 1 | 2011/7/8 13:10:11 | ADD TENANT | PATTERN 1 | 1-1 | •FW1 (ADD ACL COMMAND)<br>•CORE SW 1 (SET IP ADDRESS FOR VLAN IF)<br>: |
| 2 | 2011/7/9 14:20:12 | CHANGE TENANT | PATTERN 2 | 1-1 | •FW1 (ADD ACL COMMAND) |
| : | | : | : | : | |

Fig. 19

| MESSAGE | TRANSMISSION SOURCE | DESTINATION | DETAIL | |
|---|---|---|---|---|
| REQUEST FOR GENERATION OF PATTERN PARTS AND VALIDATION RULE | TERMINAL FOR SE | MANAGEMENT SERVER | ●KIND OF GENERATION METHOD 【GENERATION BASED ON EXISTING TENANT PATTERN】 ・LIST OF NODES OR CONFIGURATION ITEMS TO BE PATTERN PARTS CONVERSION TARGET 【GENERATION BASED ON VALIDATION DEVICE】 ・MODEL OF VALIDATION DEVICE ・LIST OF CONDITIONAL CONFIG ITEMS ・PERFORMANCE REQUIREMENT (THRESHOLD VALUE) 【GENERATION BASED ON MANUAL】 ・KIND OF GENERATED VALIDATION RULE ・KIND OF CONFIGURATION ITEM ・EXTRACTION STRING ID ・MANUAL | S101 |
| CONTROL MESSAGE FOR GENERATION OF VALIDATION RULE | MANAGEMENT SERVER | VALIDATION DEVICE | ・CONFIGURATION COMMAND ・PERFORMANCE CHECK COMMAND | S103 |
| CONTROL RESULT | VALIDATION DEVICE | MANAGEMENT SERVER | ・PERFORMANCE INFORMATION | S104 |
| PROCESSING RESULT | MANAGEMENT SERVER | TERMINAL FOR SE | ・PARTS ・VALIDATION RULE | S105 |
| INPUT OF PHYSICAL DEVICE INFORMATION | TERMINAL FOR SE | MANAGEMENT SERVER | ・PHYSICAL DEVICE INFORMATION | S106 |
| PROCESSING RESULT | MANAGEMENT SERVER | TERMINAL FOR SE | ・PROCESSING RESULT | S108 |
| REQUEST FOR GENERATION OF TENANT PATTERN OR REQUEST FOR EDIT OF TENANT PATTERN | TERMINAL FOR SE | MANAGEMENT SERVER | ・PARTS TO BE USED ・PERFORMANCE REQUIREMENT ・TENANT PATTERN GENERATION INFORMATION | S109 |
| PROCESSING RESULT | MANAGEMENT SERVER | TERMINAL FOR SE | ・PROCESSING RESULT ・VALIDATION RESULT | S112 |

Fig. 24

| MESSAGE | TRANSMISSION SOURCE | DESTINATION | DETAIL | |
|---|---|---|---|---|
| REQUEST FOR ADDITION OF TENANT | TERMINAL FOR TENANT ADMINISTRATOR | MANAGEMENT SERVER | ·TENANT PATTERN ID<br>·USER INPUT VALUE (OPTIONAL) | S501 |
| CHECK ON COMPOSITION ASSUMPTION | MANAGEMENT SERVER | NW DEVICE | ·CHECK COMMAND FOR COMPOSITION ASUMPTION | S504 |
| CHECK RESULT | NW DEVICE | MANAGEMENT SERVER | ·CHECK RESULT STRING | S505 |
| VALIDATION RESULT | MANAGEMENT SERVER | TERMINAL FOR TENANT ADMINISTRATOR | ·VALIDATION RESULT | S506 |
| CONFIGURATION REQUEST | MANAGEMENT SERVER | NW DEVICE | ·CONFIGURATION DETAIL | S507 |
| CONFIGURATION RESULT | NW DEVICE | MANAGEMENT SERVER | ·CONFIGURATION RESULT | S508 |
| PROCESSING RESULT | MANAGEMENT SERVER | TERMINAL FOR TENANT ADMINISTRATOR | ·PROCESSING RESULT | S511 |
| VALIDATION RESULT | MANAGEMENT SERVER | TERMINAL FOR DC ADMINISTRATOR | ·VALIDATION RESULT<br>·ALERT | S512 |

Fig. 29

MANAGEMENT SERVER, TENANT PATTERN VALIDATION METHOD, AND COMPUTER SYSTEM

CLAIM OF PRIORITY

The present application claims priority from Japanese patent application JP 2012-269453 filed on Dec. 10, 2012, the content of which is hereby incorporated by reference into the application.

BACKGROUND

The presently disclosed subject matter relates to a server, a method, and a system for managing a tenant.

In recent years, more and more companies use a cloud service in order to quickly handle cutbacks in cost of owning IT resources and business environments experiencing drastic changes. One of key features of the cloud service is "to provide a service on demand."

In general, the cloud service is provided by using IT resources of a data center (DC). More specifically, a service is provided by using a tenant formed on the data center. Here, the tenant represents a virtual infrastructure for each client. In particular, the tenant is targeted at a network part.

In order to realize such a feature of the cloud service as described above, it is necessary to frequently change a composition of an IT system. In the same manner, for a network being a part of the IT system, the network needs to be designed and configured to frequently change the composition. Here, design and configuration of the network represent designing a composition of the network (generating a configuration detail of the network) and setting specific parameters or the like for the designed composition of the network.

There is a feature that the composition of the tenant within the cloud service can be classified into several patterns, and hence there is a pattern-based provisioning as one approach for easily designing and configuring the network. The pattern-based provisioning is a method for automatically generating the tenant by previously defining information necessary for the design and configuration of the tenant as a pattern and selecting the pattern in a case where a user designs the tenant. This allows even the user who does not have expertise knowledge about the network to easily design and configure the tenant.

However, tenant patterns corresponding to a large number of tenant compositions are necessary in a case of newly introducing the DC, providing the cloud service having a new tenant composition on the existing DC, or other such case. To that end, it is necessary to generate the tenant patterns corresponding to the respective tenant compositions, which increases a work load involved in the generation of the tenant patterns.

This is because validation is complicated to check whether or not each tenant pattern is capable of generating a proper configuration detail (command) for a device. In particular, in the design and configuration of the network, there are a large number of items to be validated, and hence work for validation thereof imposes a heavy load.

In order to solve the above-mentioned problems, there is known a system for easily generating the configuration details of software and a network while performing validation. Examples of such system include Japanese Patent Application Laid-open No. 2008-171318 (hereinafter referred to as "Reference 1") and Japanese Patent Application Laid-open No. 2001-94559 (hereinafter referred to as "Reference 2").

Reference 1 discloses a technology capable of registering a composite part obtained by combining existing software parts in a database for reuse and validating consistency of the composite part together with a dynamic behavior thereof.

Further, Reference 2 discloses a technology for realizing an increase in efficiency of work by associating design work and construction work for a network with each other and automatically creating system data determined at a network design stage. In addition, paragraphs (0024) and (0047) of Reference 2 discloses processing for validating the consistency of data within a node database in accordance with a predetermined validation rule with respect to the node database being the configuration details of the communication network.

SUMMARY

The following problems exist as problems of the existing technologies.

A description is made of the first problem. In each of the validation methods disclosed in Reference 1 and Reference 2, the consistency between the software parts and the consistency of the data (parameter values) within the node database are validated. However, in the validation for the design and configuration of the network, it is insufficient only to validate the consistency between the parts or the consistency between the parameter values.

For example, the necessary validation includes checks on a parameter value range, a number of generated configuration items such as VRF for guaranteeing performance, a configuration order of the configuration items, and a composition necessary to perform a given configuration.

Therefore, in the validation methods disclosed in Reference 1 and Reference 2, the above-mentioned validation is not performed, which is insufficient for generation of a proper tenant pattern and a proper configuration detail.

A description is made of the second problem. In the validation method disclosed in Reference 2, the validation is performed for a value determined specifically. However, with respect to the tenant pattern, only a determination method for a parameter is defined, and a specific value is not necessarily determined. Therefore, with the validation method disclosed in Reference 2, it is not possible to validate the tenant pattern.

It should be noted that a reason why the tenant pattern needs to be validated with the configuration details having no specific value determined is that, when an error is found in the tenant pattern, a correction period becomes long without validating the tenant pattern itself. The validation of the configuration details is performed at a time of design of each individual tenant, but a designer of the tenant can perform the validation without having knowledge about the network. However, the designer cannot correct the tenant pattern by himself/herself when an error is discovered by the validation, and therefore needs to request an expert having the knowledge about the network to correct the tenant pattern. Therefore, it is highly possible that the correction period for the tenant pattern becomes longer.

In view of the above-mentioned problems, the present specification discloses a system, a method, and a device capable of performing various different kinds of validation including checks not only on the consistency but also on a parameter value range, a number of generated configuration items, a configuration order of the configuration items, and a composition necessary for a configuration as a precondition, and easily generating a tenant pattern that allows of generation of a proper configuration detail.

The disclosed system can be appreciated by the description which follows in conjunction with the following figures, wherein: a management server, which is coupled to a computer system comprising a plurality of computers, and which manages a tenant pattern being information for forming a tenant being an application system for executing a predetermined application by using computer resources within the computer system. The tenant pattern includes a configuration item including a parameter necessary for generation of the tenant and a determination method for a value of the parameter, and an ID pool for storing the value assigned to the parameter at a time of the generation of the tenant. The management server comprises a processor, a memory coupled to the processor; and, a network interface coupled to the processor. The management server has first pattern parts information for managing the configuration item as a pattern part that forms the tenant pattern, validation rule information for storing a detail of validation processing for a composition of the tenant pattern generated by using at least one the pattern part, and tenant pattern information for storing the composition of the tenant pattern generated by using the at least one the pattern part. The management server further comprises a tenant pattern generation unit for generating the tenant pattern by using the pattern part, a tenant designing unit for designing a composition of the tenant by using the tenant pattern, and generating a configuration detail for actually building the tenant on the computer system based on the designed composition of the tenant; and a validation execution unit for executing the validation processing for one of the tenant pattern and the configuration detail based on the validation rule information.

According to one embodiment of the disclosure, an operator can easily generate a tenant pattern by using pattern parts, and validation processing for the generated tenant pattern is executed, to thereby allow generation of an appropriate tenant pattern.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an explanatory table showing an example of performance requirement check scenario information according to the first embodiment;

FIG. 4 is an explanatory diagram showing an example of extraction string information according to the first embodiment;

FIG. 5 is an explanatory diagram showing an example of pattern parts information (configuration item) according to the first embodiment;

FIG. 6 is an explanatory diagram showing an example of pattern parts information (pool) according to the first embodiment;

FIG. 7 is an explanatory diagram showing an example of validation rule information according to the first embodiment;

FIG. 8 is an explanatory diagram showing an example of validation rule detail information (upper limit value) according to the first embodiment;

FIG. 9 is an explanatory diagram showing an example of validation rule detail information (composition assumption) according to the first embodiment;

FIG. 10A and FIG. 10B are explanatory diagrams showing an example of tenant pattern information according to the first embodiment;

FIG. 11 is an explanatory diagram showing an example of tenant pattern information (subnet) according to the first embodiment;

FIG. 12 is an explanatory diagram showing an example of mapping information according to the first embodiment;

FIG. 13 is an explanatory diagram showing an example of ID pool information according to the first embodiment;

FIG. 14 is an explanatory diagram showing an example of command template information according to the first embodiment;

FIG. 15 is an explanatory diagram showing an example of tenant instance information (node) according to the first embodiment;

FIG. 16 is an explanatory diagram showing an example of tenant instance information (subnet) according to the first embodiment;

FIG. 17 is an explanatory diagram showing an example of tenant instance information (mapping) according to the first embodiment;

FIG. 18 is an explanatory diagram showing an example of physical topology information according to the first embodiment;

FIG. 19 is an explanatory diagram showing an example of design and configuration task information according to the first embodiment;

FIG. 24 is an explanatory diagram illustrating an example of messages transmitted/received among devices at a execution of the generation processing for the pattern parts and the validation rule and the generation processing for the tenant pattern according to the first embodiment;

FIG. 29 is a table showing an example of messages transmitted/received among the devices at a execution of a tenant network design and configuration processing according to the first embodiment.

DETAILED DESCRIPTION OF THE EMBODIMENTS

Now, examples are described with reference to the accompanying drawings.

First Embodiment

Figure 1:
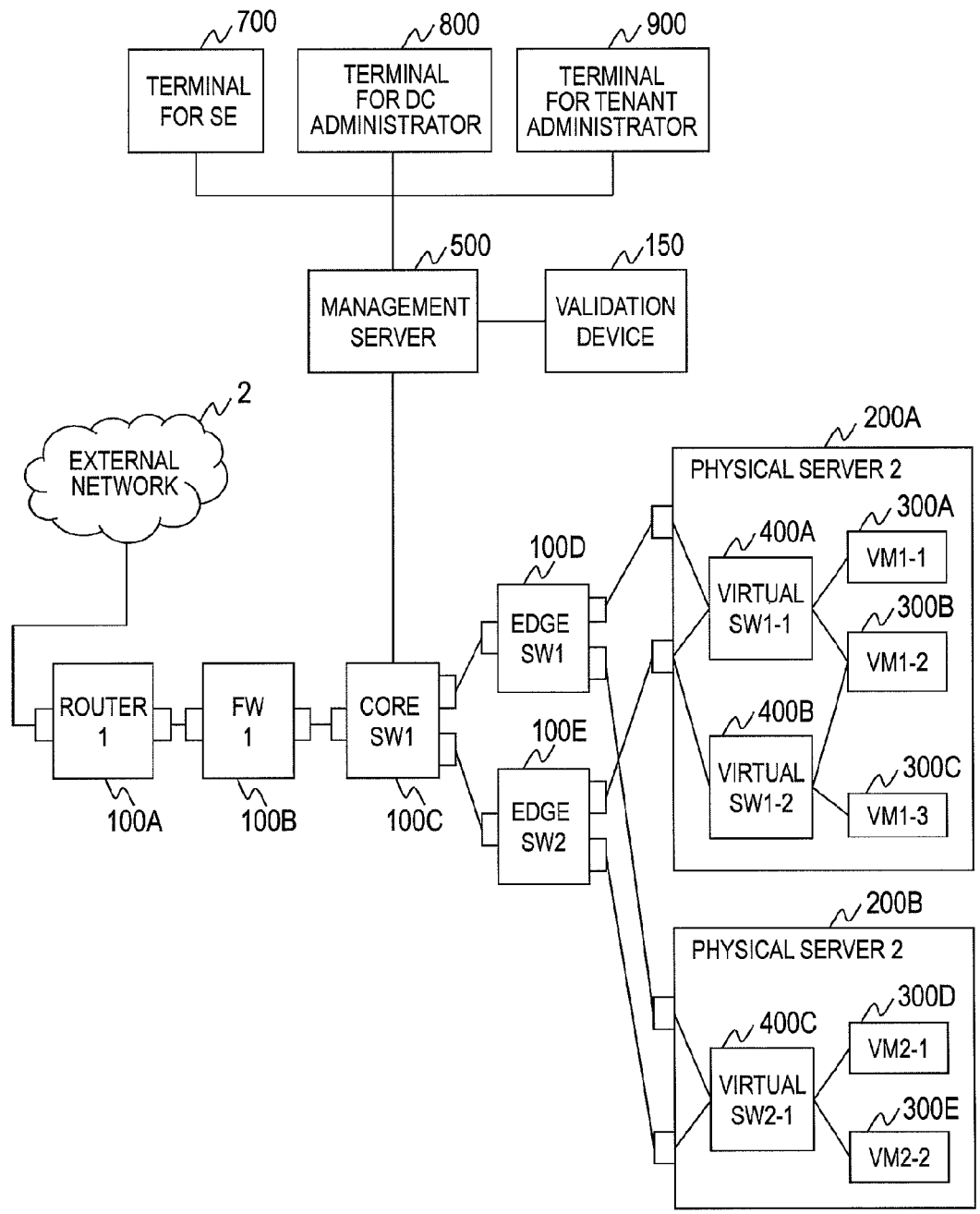
FIG. 1 is a block diagram illustrating an example of a configuration of a network system according to a first embodiment.

FIG. 1 is a block diagram illustrating an example of a configuration of a network system according to a first embodiment.

The network system according to the embodiment includes a plurality of network (NW) devices, a plurality of computers, and a management computer.

As illustrated in FIG. 1, the network system includes, for example, a router 1 (100A), a firewall (FW) 1 (100B), a core switch (SW) 1 (100C), an edge SW 1 (100D), an edge SW 2 (100E), a physical server 1 (200A), a physical server 2 (200B), a management server 500, a terminal 700 for a system engineer (SE), a terminal 800 for a data center (DC) administrator, a terminal 900 for a tenant administrator, and a validation device 150.

It should be noted that in the following description, the router 1 (100A), the FW 1 (100B), the core SW 1 (100C), the edge SW 1 (100D), and the edge SW 2 (100E) are also referred to collectively as "NW devices 100". In addition, in the following description, the NW device 100, the physical server 1 (200A), and the physical server 2 (200B) are also referred to collectively as "physical devices". Further, the network system is not limited to the above-mentioned physical device, and may be a load balancer, a virtual private network (VPN) device, or the like.

The physical server 200 executes a virtualization unit (not shown) for generating a virtual machine 300 (hereinafter referred to as "VM"). The physical server 200 includes a processor, a memory, and a network interface, and the processor executes a program for realizing the virtualization unit loaded on the memory.

The virtualization unit operates at least one VM 300 generated by using computer resources of the physical server 200. Further, the virtualization unit generates a virtual SW 400 for coupling the VM 300, and the VM 300 is coupled to an external network through the virtual SW 400. It should be noted that the virtualization unit may be constructed of a hypervisor, a virtual machine monitor (VMM), or the like.

The router 1 (100A) is coupled to an external network 2 such as a VPN or the Internet. A network ranging from the router 1 (100A) to the physical servers 200 or the management server 500 forms an internal network in a data center (hereinafter referred to as "DC").

It should be noted that the management server 500 is coupled to the NW device 100, the physical server 200, the virtual SW 400, and the VM 300 through a logically separate network. It should be noted that the NW device 100, the physical server 200, the virtual SW 400 described later, and the VM 300 may be coupled to the management server 500 through management networks that are physically different from one another.

The NW device 100 couples devices within a network to each other, and transfers information transmitted/received across the network to the device at a predetermined destination. It should be noted that the virtual SW has the same function as the NW device 100. It should be noted that the NW device 100 includes a processor, a memory, and a network interface.

The management server 500 manages the NW device 100, the physical server 200, the virtual SW, and the VM. By communicating to/from the NW device 100, the management server 500 can obtain composition information on the network system and perform a configuration or the like for the NW device 100, the physical server 200, the virtual SW 400, and the VM 300. In the embodiment, the management server 500 generates pattern parts used for generating a tenant pattern.

Here, the tenant pattern represents information formed of a determination method for a parameter necessary for design of a tenant. The pattern parts represent information formed of at least any one of at least one configuration item and at least one ID pool and repeatedly used in generating the tenant pattern. The configuration item represents information including at least one parameter set for a node or the like forming the network system and the determination method for the parameter. The ID pool represents a set of IDs assigned to the parameters included in the configuration item.

Further, in the following description, "generation of the tenant" indicates that a configuration detail of the tenant is generated by using the tenant pattern, and the configuration detail of the tenant is set for an actual system.

It should be noted that a hardware configuration and a software configuration of the management server 500 are described later with reference to FIG. 2.

The terminal 700 for the SE, the terminal 800 for the DC administrator, and the terminal 900 for the tenant administrator each include a processor, a memory, a network interface, an input device formed of a mouse, a keyboard, or the like, and an output device formed of a display device or the like. The terminal 700 for the SE, the terminal 800 for the DC administrator, and the terminal 900 for the tenant administrator are coupled to, for example, the management server 500.

A network SE operates the terminal 700 for the SE, the DC administrator operates the terminal 800 for the DC administrator, and the tenant administrator operates the terminal 900 for the tenant administrator, to thereby allow various instructions to be issued to the management server 500.

Here, the network SE represents a user who designs an infrastructure part that does not depend on each tenant within a DC and structures and changes the infrastructure part. The DC administrator represents a user who is in charge of operation of the DC and manages a plurality of tenants generated within the DC. The tenant administrator manages only the tenant of which he/she is in charge (such as generation of the tenant and change of the composition).

The validation device 150 is a device used for validating an operation of the NW device, and examples thereof include a router, an SW, an FW, a load balancer, and a VPN device. The validation device 150 is coupled to the management server 500 through a network for validation provided separately from a network for service.

It should be noted that the physical devices forming the network system are not limited to the composition illustrated in FIG. 1, and can be changed in number appropriately.

Figure 2:
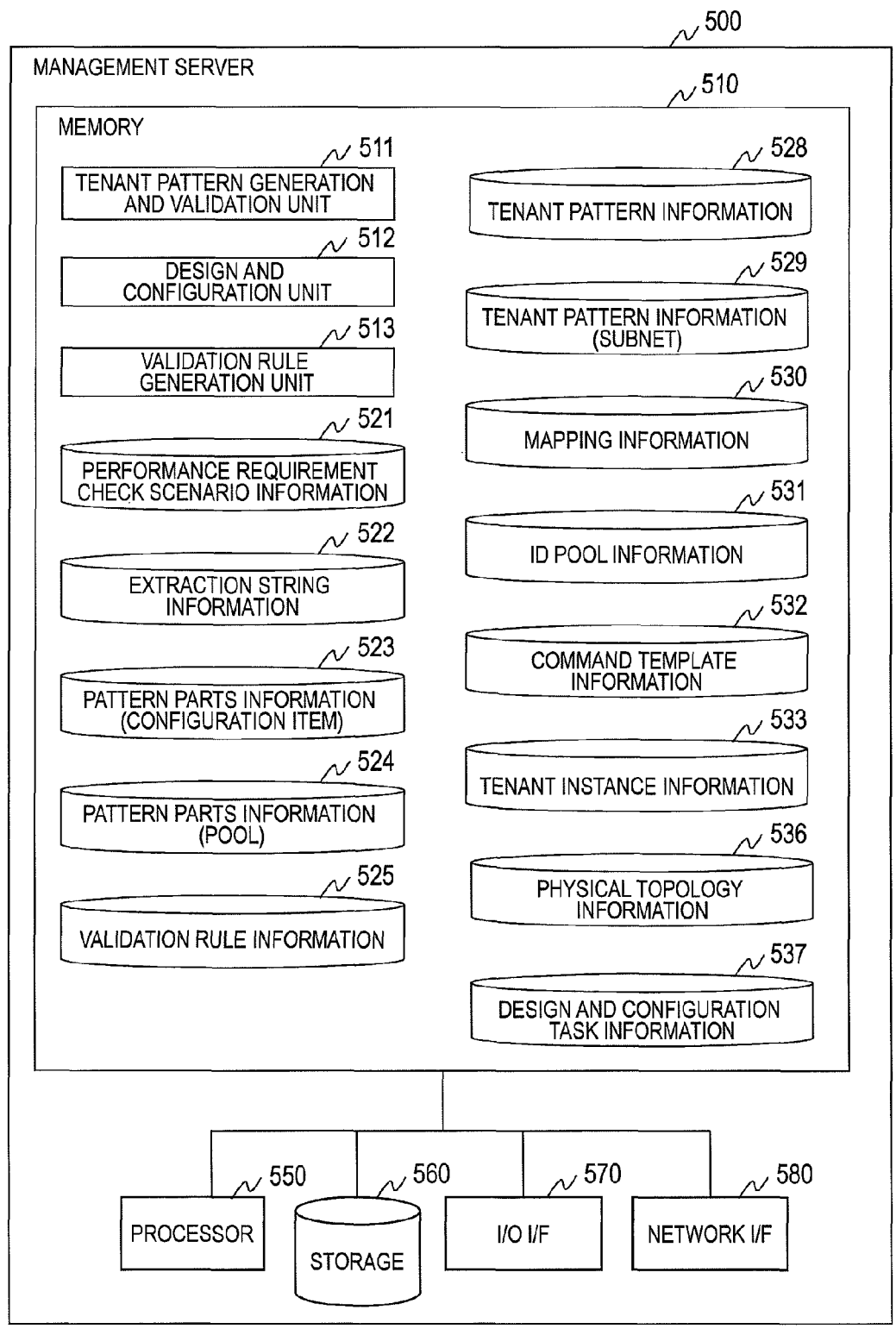
FIG. 2 is a block diagram illustrating an example of a configuration of a management server according to the first embodiment.

FIG. 2 is a block diagram illustrating an example of a configuration of the management server 500 according to the first embodiment.

The management server 500 includes a processor 550, a memory 510, a storage 560, an I/O interface (I/F) 570, and a network interface (I/F) 580.

The management server 500 transmits/receives information to/from another device coupled to the internal network, such as NW device 100, via the network I/F 580. Further, the I/O I/F 570 is constructed of, for example, a host bus adapter (HBA), and can be coupled to a storage (not shown).

The processor 550 executes a program stored in the memory 510. The memory 510 stores the program executed by the processor 550 and information necessary for execution of the program.

Specifically, the memory 510 stores programs for realizing a tenant pattern generation and validation unit 511, a design and configuration unit 512, and a validation rule generation unit 513. Further, the memory 510 stores performance requirement check scenario information 521, extraction string information 522, pattern parts information (configuration item) 523, pattern parts information (pool) 524, validation rule information 525, tenant pattern information 528, tenant pattern information (subnet) 529, mapping information 530, ID pool information 531, command template information 532, tenant instance information 533, physical topology information 536, and the design and configuration task information 537.

The processor 550 operates in accordance with the program stored in the memory 510, to thereby operate as a functional unit having a predetermined function. For example, the processor 550 operates the program for realizing the tenant pattern generation and validation unit 511, to thereby realize a function of the tenant pattern generation and validation unit 511. The same applies to the other programs. In addition, the processor 550 operates as a functional unit for realizing each of a plurality of kinds of processing executed by the respective programs.

In the following description, a sentence whose subject is a functional unit indicates that the processor 550 operates in accordance with the program for realizing the functional unit.

Further, each program may be stored in a non-transitory storage medium such as the storage 560. In this case, the processor 550 reads the program from the storage 560, loads the read program onto the memory 510, and executes the loaded program.

The information including tables stored in the memory 510 can be stored in the storage 560, a memory device such as a nonvolatile semiconductor memory, a hard disk drive, or a solid state drive (SSD), or a computer-readable non-transitory data memory medium such as an IC card, an SD card, or a DVD.

Now, a description is made of the programs and the information stored in the memory 510.

The tenant pattern generation and validation unit 511 uses the pattern parts to generate the tenant pattern requested by the network SE. In addition, the tenant pattern generation and validation unit 511 uses a validation rule to validate details of the generated tenant pattern.

The design and configuration unit 512 uses the tenant pattern to generate the configuration detail of the tenant requested by the tenant administrator. In addition, the design and configuration unit 512 reflects (sets) the configuration detail of the generated tenant on the physical device. Accordingly, a predetermined tenant is generated.

The validation rule generation unit 513 generates the pattern parts requested by the network SE and the validation rule.

Here, the validation rule represents information for validating the tenant pattern or the configuration detail of an actual tenant generated by using the tenant pattern. As described later, the validation rule generation unit 513 generates the validation rules such as the validation rule "upper limit of the number of instances" and the validation rule "parameter value range".

The performance requirement check scenario information 521 stores information indicating a correspondence relationship between a command for checking performance of the validation device 150 and a response string corresponding to the command in a case where the validation rule "upper limit of the number of instances" is generated. The performance requirement check scenario information 521 is described later in detail with reference to FIG. 3.

The extraction string information 522 stores a string for extracting a parameter value range or the upper limit value from a manual for the validation device 150 or the like in a case where the validation rule "parameter value range" or the validation rule "upper limit of the number of instances" is generated. The extraction string information 522 is described later in detail with reference to FIG. 4.

The pattern parts information (configuration item) 523 stores information relating to the configuration item among the pattern parts. The pattern parts information (configuration item) 523 is used to generate or change the tenant pattern. The pattern parts information (configuration item) 523 is described later in detail with reference to FIG. 5.

The pattern parts information (pool) 524 stores information relating to the ID pool among the pattern parts. The pattern parts information (pool) 524 is used to determine the parameter value. The pattern parts information (pool) 524 is described later in detail with reference to FIG. 6.

The validation rule information 525 stores information relating to the validation rule generated by the validation rule generation unit 513. In the embodiment, a plurality of validation rules is generated, and hence the validation rule information 525 stores information relating to a plurality of validation rules. The validation rule information 525 is described later in detail with reference to FIG. 7, FIG. 8, and FIG. 9.

The tenant pattern information 528 stores information relating to the tenant pattern being information for generating the tenant. The tenant pattern information 528 stores information including a node, a configuration item, a parameter, and a determination method for a parameter value. The tenant pattern information 528 is described later in detail with reference to FIG. 10A and FIG. 10B.

The tenant pattern information (subnet) 529 is information for generating a subnet of the tenant. The tenant pattern information (subnet) 529 is described later in detail with reference to FIG. 11.

The mapping information 530 is information indicating a correspondence relationship between the node in the tenant pattern and the physical device to be configured. The mapping information 530 is described later in detail with reference to FIG. 12.

The ID pool information 531 is information that defines the ID pool for determining the parameter value of the tenant pattern. The ID pool information 531 is described later in detail with reference to FIG. 13.

The command template information 532 is the string of a configuration command whose parameter part has not been set yet. The command template information 532 is information relating to the configuration item, and the configuration command is generated by substituting the determined parameter value into the parameter part of a command template. The command template information 532 is described later in detail with reference to FIG. 14.

The tenant instance information 533 manages information on tenant instance relating to the node generated or updated by the design and configuration unit 512. Here, the instance represents the tenant generated from the tenant pattern and substances of a node, a subnet, a mapping, and the like within the tenant.

In the embodiment, there exist tenant instance information 5331, 5332, and 5333 relating to the instances of the node, the subnet, and the mapping, respectively. The tenant instance information 533 is described later in detail with reference to FIG. 15, FIG. 16, and FIG. 17.

The physical topology information 536 stores authentication information, an address, and the like that allow each functional unit to collect or set information from/for a physical device or a virtual device to be managed. The physical topology information 536 is described later in detail with reference to FIG. 18.

The design and configuration task information 537 manages a design or configuration task including the configuration detail designed by an operator or the like. The design and configuration task information 537 is described later in detail with reference to FIG. 19.

FIG. 3 is an explanatory table showing an example of the performance requirement check scenario information 521 according to the first embodiment.

The performance requirement check scenario information 521 includes an ID 5211, a performance requirement 5212, a command 5213, and a response string 5214.

The ID 5211 is an identifier for uniquely identifying an entry within the performance requirement check scenario information 521, in other words, a scenario. The performance requirement 5212 is information indicating performance of a check target. The performance requirement 5212 is input from the terminal 700 for the SE in a case where the pattern parts and the validation rule are generated.

The command 5213 is the string of the command used to check the performance of the check target. The response string 5214 is a string being an execution result of the command. A performance value of the check target is extracted from within strings stored in the response string 5214. In this item, the performance value of the check target is extracted from within the response string 5214 based on a regular expression or the like. In the example shown in FIG. 3, the parenthesized part "( )" is extracted as the performance value of the check target value.

FIG. 4 is an explanatory diagram showing an example of the extraction string information 522 according to the first embodiment.

The extraction string information 522 includes an ID 5221 and an extraction string 5222.

The ID 5221 is an identifier for uniquely identifying an entry within the extraction string information 522, in other words, an extraction string. This item is input from the terminal 700 for the SE in a case where the pattern parts and the validation rule are generated. At this time, the extraction string corresponding to the ID 5221 is used to generate the validation rule.

The extraction string 5222 is a string used to extract the parameter value range, an upper limit value of the number of instances, or the like from the manual. The regular expression may be used for this item. In the example shown in FIG. 4, the parenthesized parts "value 1" and "value 2" are extracted to indicate the parameter value range.

FIG. 5 is an explanatory diagram showing an example of the pattern parts information (configuration item) 523 according to the first embodiment.

The pattern parts information (configuration item) 523 includes a pattern parts ID 52301, a node 52302, a multiplicity 52303, a configuration item 52304, a configuration order 52305, a parameter ID 52306, a parameter 52307, a determination method 52308, a parameter type tag 52309, and a command template 52310.

The pattern parts ID 52301 is an identifier for uniquely identifying an entry within the pattern parts information (configuration item) 523, in other words, the pattern part. The pattern parts information (configuration item) 523 stores information relating to the pattern parts formed of at least one configuration item.

The node 52302 is information for identifying a node in a case where the pattern part is the node. In a case where the pattern part is other than the node, the node 52302 stores a hyphen symbol.

The multiplicity 52303 is information relating to the number of nodes to be generated. As shown in FIG. 5, a default number of instances can be defined by using an asterisk symbol and a numerical value. For example, in the entry whose pattern parts ID 52301 is "part 4", the default number of instances is "2".

The configuration item 52304 is an identification name of the configuration item forming the pattern part. The configuration order 52305 is a configuration order on a configuration item basis. This item is used at a time of the design of the tenant to determine the configuration order.

The parameter ID 52306 is an identifier for uniquely identifying a parameter included in the configuration item. The parameter 52307 is an identification name of the parameter.

The determination method 52308 is the determination method for the parameter corresponding to the parameter 52307. The determination method is described later in detail with reference to FIGS. 10A and 10B. It should be noted that the determination method for the pattern parts is different from the determination method for the tenant pattern in the following points.

The first point is that only the information "refer to determine" is defined without defining a reference target in a case of the determination method "refer" for referring to external information that is not defined in the pattern parts. It should be noted that in a case where the validation rule "parameter value reference" is applied to the parameter, the management server 500 presents a candidate for the reference target to the user at a time of generation of the tenant pattern to support the determination of the reference target.

The second point is that, in the determination method "assignment from pool", the ID pool within the pattern parts information (pool) 524 shown in FIG. 6 is used at the time of the generation of the tenant pattern, and in the determination method "pool (designate pool to be used at generation of pattern)", the pool is designated at the time of the generation of the tenant pattern.

The parameter type tag 52309 is a type of the parameter. This item is used to select a parameter candidate for the reference target of the configuration item in which the validation rule "parameter value reference" or the like is set.

The command template 52310 is an identifier of the command template used in a case where the configuration command for the configuration item is generated. In the command template, addition of the configuration item and deletion of the configuration item are designated.

According to the embodiment, the tenant pattern can be easily generated by using the pattern parts as described above.

FIG. 6 is an explanatory diagram showing an example of the pattern parts information (pool) 524 according to the first embodiment.

The pattern parts information (pool) 524 includes a pattern parts ID 5241, a pool name 5242, a kind 5243, and pool resource 5244.

The pattern parts ID 5241 is an identifier for uniquely identifying an entry within the pattern parts information (pool) 524, in other words, the pattern part. The pattern parts information (pool) 524 stores information relating to the pattern parts formed of the ID pool.

The pool name 5242 is an identification name of the ID pool. The kind 5243 is a kind of the ID pool. It should be noted that the ID pool is described later in detail with reference to FIG. 13.

The pool resource 5244 stores a specific detail of the ID pool. In the example shown in FIG. 6, the pool resource 5244 of the entry whose pool name 5242 is "IP address 1" stores a range of a network address and a default mask length, and the pool resources 5244 of the entries whose pool names 5242 are "VLAN ID", "policy ID", and "ACL ID" each store a minimum ID and a maximum ID.

It should be noted that the default mask length is a default mask length of the assigned network address. The minimum ID is a minimum value of IDs within the ID pool. The maximum ID is a maximum value of the IDs within the ID pool.

Next, a description is made of the validation rule information 525. In the embodiment, the validation rule information 525 includes: validation rule information 5251 for managing information on the validation rule itself; and validation rule detail information (upper limit value) 5252 and validation rule detail information (composition assumption) 5253 for each managing a specific detail of a predetermined validation rule. The respective pieces of information are described below.

FIG. 7 is an explanatory diagram showing an example of the validation rule information 5251 according to the first embodiment.

The validation rule information 5251 includes a validation rule ID 52511, a validation rule kind 52512, a validation rule detail 52513, a validation target 52514, and a device information 52515.

The validation rule ID 52511 is an identifier for uniquely identifying an entry within the validation rule information 5251, in other words, the validation rule.

The validation rule kind 52512 is a kind of the validation rule. In the embodiment, there are five kinds of validation rule, in other words, "parameter value range", "upper limit of the number of instances", "parameter value reference", "configuration order", and "composition assumption".

The validation rule "parameter value range" is a rule for validating a possible range of the parameter value. The validation rule "upper limit of the number of instances" is a rule for validating the upper limit value of the number of instances of the configuration item or the node. The validation rule "parameter value reference" is a rule for validating the type of a predetermined parameter within the tenant pattern. The validation rule "configuration order" is a rule for validating a characteristic in order of the configuration items. The validation rule "composition assumption" is a rule for validating presence/absence of a composition that needs to be set in advance in order to set the configuration item. It should be noted that the composition being a validation target is mainly the configuration item shared by tenants.

The validation rule detail 52513 is a detail of the validation rule. The details stored in the validation rule detail 52513 differ depending on the kind of the validation rule as follows.

In the validation rule "parameter value range", the validation rule detail 52513 defines that a predetermined parameter value has a range. In the example shown in FIG. 7, the validation rule detail 52513 defines that an FW policy ID has a parameter value range. In addition to the FW policy ID, there are, for example, a line bandwidth of a switch, a VLAN ID, various priorities of a spanning tree port or the like, various transmission intervals of a spanning tree BPDU or the like, and a metric of a routing protocol.

The validation rule "upper limit of the number of instances" defines that the validation rule detail 52513 has an upper limit of the number of instances. It should be noted that the upper limit value of the number of instances differs depending on a performance requirement. Further, the upper limit value of the number of instances differs depending on the configuration item being a precondition (function used simultaneously). Therefore, for the validation rules, the performance requirement and a conditional config item are defined as shown in FIG. 8, and the upper limit value is defined for each performance requirement or for each combination of the conditional config items.

In the example shown in FIG. 7, VRF is defined as the configuration item provided with the upper limit value of the number of instances. In addition to the VRF, there is, for example, a virtual router of the FW.

In the validation rule "parameter value reference", the validation rule detail 52513 defines that a predetermined parameter has reference to another parameter, and defines identification information on the parameter of the referential target. The identification information on the parameter of the referential target is defined by using the parameter type tag 52309.

In the example shown in FIG. 7, the validation rule detail 52513 defines that an IP of a transmission destination server of the load balancer has reference to another parameter and that the type of the parameter of the referential target is "public server IP". In addition to the IP of the transmission destination server, there are, for example, "IP address of default gateway", "IP address of upper-level switch", "VLAN ID set for port", and "VLAN ID set for counter port".

In the validation rule "configuration order", the validation rule detail 52513 defines the characteristic in the order of two configuration items A and B. In the embodiment, it is assumed that the configuration item B is the configuration item set after the configuration item A. Further, the configuration item is defined by using a configuration item type tag 52805 described later with reference to FIG. 10A.

In the example shown in FIG. 7, the validation rule detail 52513 defines that "VRF" is set prior to "associate VRF with VLAN". In addition, there are, for example, "VLAN" and "IP setting for VLAN IF", and "access list" and "flow definition".

In the validation rule "composition assumption", the validation rule detail 52513 defines a configuration item that needs to be set in advance for the configuration item being the validation target of the validation rule. In the example shown in FIG. 7, the validation rule detail 52513 defines that "common zone" needs to be set in advance for "ACL". In addition, there are, for example, "VLAN" and "set trunk mode for port", "cause VLAN to belong to ring" and "ring", and "set VLAN for port channel" and "port channel (LLDP)".

The validation target 52514 is information for identifying the target (pattern part) to which the validation rule is applied. In the embodiment, an identifier of the pattern part or an identifier of the parameter is used as information for identifying the pattern part to which the validation rule is applied. It should be noted that the stored information differs depending on the kind of the validation rule as follows.

In the case of the validation rule "parameter value range", each individual parameter is the validation target. In the case of the validation rule "upper limit of the number of instances", the configuration item is the validation target. In the case of the validation rule "parameter value reference", each individual parameter is the validation target. In the case of the validation rule "configuration order", a specific pattern part is not used as the validation target, and the configuration items defined in the validation rule detail 52513 and the configuration items having the same parameter type tag 52309 are the validation targets. In the case of the validation rule "composition assumption", the configuration item is the validation target.

It should be noted that the validation target of the validation rule can also be used for the validation of the tenant pattern itself instead of the validation on a pattern part basis. In this case, the target parameter stored in the validation rule detail 52513 of the validation rule, or the parameter or the configuration item of the tenant patterns having the same parameter type tag 52309 of the configuration item is used as the validation target.

The device information 52515 is information on a physical device basis, which is used in a case where the validation rule is applied. The device information 52515 includes a model 52516 and a parameter value 52517.

The model 52516 is identification information on a model of the physical device. The parameter value 52517 is the parameter value or the like for the physical device.

In the validation rule "parameter value range", the parameter value 52517 defines the parameter value range. In the validation rule "upper limit of the number of instances", the parameter value 52517 defines the upper limit value of the number of instances for each performance requirement and for each combination of the conditional config items.

In the example shown in FIG. 7, there are two performance requirements, and there are two conditional config items for each of the performance requirements. For example, it is understood that the upper limit value is "35", in a case where the performance requirement 1 "CPU load of 50% or less" and the precondition 1 "OSPF" is operated for each VRF while inhibiting the precondition 2 "multicast" from operating.

Further, in a case where the conditional config item is "calculation", as shown in the entry whose validation rule ID is "10", the parameter value 52517 of the device information 52515 defines only the upper limit value of the number of instances for each performance requirement. In a case where there is a conditional config item, a calculation defined in FIG. 8 is executed for the upper limit value of the number of instances. For example, in a case where there is the conditional config item "OSPF" with the performance requirement being "CPU load of 80% or less", the upper limit value of the number of instances is 200 (upper limit value 2)×0.5=100. In the validation rules "parameter value reference", "configuration order", and "composition assumption", it is not necessary to define the parameter value for each model.

The management server 500 can perform such various kinds of validation as described above on the configuration detail of the tenant or the tenant pattern. Accordingly, the tenant or the tenant pattern having an appropriate composition can be generated easily.

The validation based on the validation rule "parameter value range" is performed, to thereby allow the parameter value to be set within a range supported by the physical device. The parameter value out of the supported range can be input to the physical device, which may cause an illegal operation, but the validation based on the validation rule is performed, to thereby allow the operator or the like to previously confirm the parameter value range to be input to the physical device. Therefore, it is possible to reduce an error in designing the tenant pattern or the tenant.

The validation based on the validation rule "upper limit of the number of instances" is performed, to thereby be able to ensure quality demanded by the tenant pattern or the tenant. In addition, in the validation based on the validation rule "upper limit of the number of instances", it is possible to perform the validation corresponding to the performance requirement different between the tenant patterns.

The validation based on the validation rule "parameter value reference" is performed, to thereby facilitate association with a parameter different from the parameter of the pattern part in a case where the pattern part is used and facilitate incorporation thereof into the tenant pattern.

The validation based on the validation rule "configuration order" is performed, to thereby allow the operator to set the configuration items in a proper configuration order. Therefore, it is possible to reduce a configuration error in the tenant.

The validation based on the validation rule "composition assumption" is performed, to thereby allow reduction in the configuration error.

FIG. 8 is an explanatory diagram showing an example of the validation rule detail information (upper limit value) 5252 according to the first embodiment.

The validation rule detail information (upper limit value) 5252 stores information relating to the performance requirement and the conditional config item relating to the validation rule "upper limit of the number of instances" among the validation rules shown in FIG. 7.

The upper limit value of the number of instances is affected by the performance requirement for the tenant pattern and the performance thereof, and differs depending on another configuration item (conditional config item) relating to the configuration item being the validation target, and hence the performance requirement and the conditional config item are defined in the validation rule detail information (upper limit value) 5252.

The validation rule detail information (upper limit value) 5252 includes a validation rule ID 52521, a performance requirement 52522, a precondition ID 52523, a conditional config item (specific value) 52524, and a conditional config item (calculation) 52525.

The validation rule ID 52521 is an identifier for uniquely identifying the validation rule. Here, the identifier of the entry corresponding to the validation rule "upper limit of the number of instances" is stored.

The performance requirement 52522 is information indicating the performance requirement and the upper limit value of the performance requirement. The upper limit value of the number of instances is specifically defined in the parameter value 52517 of the device information 52515 shown in FIG. 7, and this item is information used for reference (such as upper limit value 1 and upper limit value 2) to the parameter value 52517. In the example shown in FIG. 8, a CPU load is defined as the performance requirement. In addition, there are, for example, a usage rate of a MAC table, a memory usage rate, and a bandwidth usage rate.

The precondition ID 52523 is an identifier for uniquely identifying the conditional config item.

The conditional config item (specific value) 52524 is the configuration item being the precondition for the upper limit value of the number of instances. The upper limit value of the number of instances is defined for each combination of the above-mentioned items. In the example shown in FIG. 8, the OSPF and the multicast are defined as the conditional config items. In addition, there are, for example, a ring, a spanning tree, and various dynamic routing protocols.

The conditional config item (calculation) 52525 is the configuration item being the precondition for the upper limit value of the number of instances and a calculation detail used for calculating the upper limit value of the number of instances in accordance with the presence/absence of the configuration item.

FIG. 9 is an explanatory diagram showing an example of the validation rule detail information (composition assumption) 5253 according to the first embodiment.

The validation rule detail information (composition assumption) 5253 stores information relating to a command for checking the validation rule "composition assumption" and a response string corresponding to the command.

The validation rule detail information (composition assumption) 5253 includes a target validation rule ID 52531, a target composition 52532, a check command 52533, and a response string 52534.

The target validation rule ID 52531 is an identifier for uniquely identifying the validation rule. Here, the identifier of the entry corresponding to the validation rule "composition assumption" is stored. The target composition 52532 is a composition to be checked (the configuration item).

The check command 52533 is a command for checking whether or not the composition to be checked is set. The response string 52534 is a part of a string returned after executing the check command 52533 in a case where the composition to be checked is set. Therefore, in a case where the string returned as a result of executing the check command 52533 includes the response string 52534, it is determined that a necessary composition is set.

FIG. 10A and FIG. 10B are explanatory diagrams showing an example of the tenant pattern information 528 according to the first embodiment.

The tenant pattern information 528 includes a tenant pattern ID 52801, a node 52802, a multiplicity 52803, a configuration item 52804, the configuration item type tag 52805, a configuration order 52806, a pattern parts ID 52807, an upper limit value 52808 of the number of instances, a parameter 52809, a determination method 52810, a parameter type tag 52811, an application flow 52812, and a command template 52813.

In the tenant pattern information 528, management information for managing the tenant can be defined as the node of the tenant. Further, in the tenant pattern information 528, a parameter can be defined for the management information. It should be noted that no physical device is mapped to the management information. In the examples shown in FIG. 10B, the last entry corresponds to the above-mentioned management information.

The tenant pattern ID 52801 is an identifier for uniquely identifying the tenant pattern. The node 52802 is information for identifying the node defined in the tenant pattern.

The multiplicity 52803 is the number of nodes of the same composition generated in the tenant. Here, the nodes of the same composition indicate nodes that belong to the same subnet and have the same configuration item and the same parameter. As shown in FIG. 10B, a default number of nodes can be defined by using a predetermined symbol and a numerical value.

For example, the hyphen symbol is stored in the multiplicity 52803 of the entry whose node 52802 is "core SW 1". In the embodiment, the stored hyphen symbol indicates that one node of interest is generated. Further, in a case where the asterisk symbol is stored in the multiplicity 52803 of the entry whose node 52802 is "VM 1", the nodes are generated by the number that follows the asterisk symbol.

It should be noted that in a case where the operator designates the number of nodes, the designated number of nodes are generated. On the other hand, in a case where the operator does not designate the number of nodes, the nodes are generated by the number defined in the multiplicity 52803.

The configuration item 52804 is a configuration item for the node. The configuration item type tag 52805 is information indicating the type of the configuration item 52804. The configuration item type tag 52805 is used for identifying the configuration item being the validation target in the validation rule "configuration order" or the like. Further, in a case where the validation rule "upper limit of the number of instances" is generated by the validation rule generation unit 513, the configuration item used based on the configuration item type tag 52805 is identified in order to obtain the command template or the like for setting the conditional config item.

The configuration order 52806 is the configuration order of the configuration items within the tenant pattern. The configuration details are generated in the order indicated in the configuration order 52806. Further, in the validation based on the validation rule "configuration order", it is validated whether or not this item is proper among the configuration items.

The pattern parts ID 52807 is the identifier of the pattern part used at the time of the generation of the tenant pattern. It should be noted that in a case where the pattern parts are not used, the hyphen symbol is stored in the pattern parts ID 52807.

The upper limit value 52808 of the number of instances is the upper limit value of the number of instances of the configuration item. Based on the conditional config item and the performance requirement input at the time of the generation of the tenant pattern, the upper limit value of the number of instances is selected from the parameter value 52517 for the validation rule "upper limit of the number of instances" shown in FIG. 7, and the selected upper limit value of the number of instances is stored in this item.

The parameter 52809 is an identification name of the parameter included in the configuration item. It should be noted that the parameter can be used for a plurality of configuration items within the node.

The determination method 52810 is a method of or definition for determining the parameter value at the time of designing a network composition.

The determination method 52810 stores values indicating the determination methods, such as "fixed", "pool", "pool (designated subnet)", and "refer".

The "fixed" is a method of determining a preset fixed value as the parameter value, and is defined in tenant pattern information. In the examples shown in FIGS. 10A and 10B, the fixed value "Any" is defined in the determination method 52810 corresponding to the parameter 52809 "transmission source" among the entries whose node 52802 is "FW 1".

The "pool" is a method of designating a predetermined ID pool from the ID pool information 531, and assigning an unused ID from the designated ID pool as the parameter value. It should be noted that the value assigned from the designated ID pool is modified to the status "used" in the designated ID pool.

Further, in the ID pool, a logic about which ID is to be assigned when a request for assignment is received is designated in advance. Examples of the logic include, for example, a logic "from low number", which indicates assignment in an order from the minimum unused ID, and a logic "random", which indicates random assignment from the unused IDs.

In the examples shown in FIGS. 10A and 10B, among the entries whose node 52802 is "FW 1", the logic "from low number" is defined in the determination method 52810 corresponding to the parameter 52809 "ACL ID". Therefore, the minimum ID among the unused IDs within the ID pool 4 is assigned to "ACL ID".

The "pool (designated subnet)" is a method of assigning, as the parameter value, the unused IP address from the network address assigned to the designated subnet. It should be noted that the assigned value is modified to the state "used" in the designated ID pool.

The "refer" is a method of referring to the parameter value of another node or the parameter value of subnet information to set the referred parameter value as the parameter value of a reference source. It should be noted that the method is not limited to the case of setting the same parameter value as the parameter value of the reference target, and it is also possible to set, as the parameter value of the reference source, the parameter value obtained by executing preset calculation processing, the parameter value obtained by executing preset string processing, or the like based on the parameter value of the reference target.

In the examples shown in FIGS. 10A and 10B, as defined in the determination method 52810 corresponding to the parameter 52809 "destination" among the entries whose node 52802 is "FW 1", the network address of a subnet 3 is referred to, and the referred value is the value of the destination.

The parameter type tag 52811 is the type of the parameter, and is used for identifying another parameter relating to the parameter in the validation rule "parameter value reference" or the like.

The application flow 52812 is information on an application flow for carrying out design and configuration for each configuration item and information relating to an operation type of the configuration item when the design and configuration are carried out. The operation type includes "add", "change", and "delete". The management server 500 uses the command template corresponding to the designated operation type to generate the configuration detail of the node. It should be noted that a plurality of application flows can be associated with one configuration item.

In the examples shown in FIGS. 10A and 10B, "change ACL" and "add" are defined as the application flow and the operation type, respectively, in the application flow 52812 corresponding to the configuration item 52804 "ACL" among the entries whose node 52802 is "FW 1". Therefore, in a case where the operator designates the application flow "change ACL", the management server 500 adds the ACL of the FW 1, and uses the command template for addition to generate the configuration detail of the node.

The command template 52813 is template information for generating the command of the configuration detail of the node. The command templates for the addition, change, and deletion are registered in the command template 52813.

FIG. 11 is an explanatory diagram showing an example of the tenant pattern information (subnet) 529 according to the first embodiment.

The tenant pattern information (subnet) 529 includes a tenant pattern ID 5291, a subnet ID 5292, a VLAN ID pool 5293, a member node 5294, and an address pool 5295.

The tenant pattern ID 5291 is an identifier for identifying the tenant pattern to which the subnet belongs. The subnet ID 5292 is an identifier for uniquely identifying the subnet of the tenant pattern. The VLAN ID pool 5293 is an ID pool used when a VLAN ID used for the subnet is assigned. The member node 5294 is information on the node belonging to the subnet. The address pool 5295 is an ID pool used when the network address used for the subnet is assigned.

FIG. 12 is an explanatory diagram showing an example of the mapping information 530 according to the first embodiment.

The mapping information 530 includes a tenant pattern ID 5301, a node 5302, a physical device 5303, and node virtualization 5304.

The tenant pattern ID 5301 is an identifier for identifying the tenant pattern. The node 5302 is the identifier of the node that forms the tenant pattern, and is information indicating the node being a mapping source. The physical device 5303 is information for identifying the physical device being a mapping destination of the node.

The node virtualization 5304 is information indicating whether or not to virtualize the node. In the embodiment, the information that permits the virtualization of the node is stored in the node virtualization 5304. For example, when the node is a server, there exist two mapping destinations of the physical server 200 and the VM 300 as the mapping destination of the server, and when the information that permits the virtualization of the node is stored in the node virtualization 5304, the VM 300 operating on the physical server 200 shown in the physical device 5303 is the mapping destination.

FIG. 13 is an explanatory diagram showing an example of the ID pool information 531 according to the first embodiment.

The ID pool information 531 includes an ID 5311, a pool name 5312, a kind 5313, and a pool resource 5314.

The ID pool information 531 is information for generating a pool instance for managing use statuses of IDs and addresses. There are a case where a common ID pool is used by a plurality of tenant patterns and a case where the ID pool is used for each individual tenant pattern instance.

The ID 5311 is an identifier for uniquely identifying the ID pool. The pool name 5312 is name information on the ID pool.

The kind 5313 is information on the kind of the ID pool. Examples of the kind of the ID pool include "IP address" and "ID". In the ID pool of "IP address", ID management is performed at two stages on a network address basis and on an individual IP address basis. In the ID pool of "ID", the ID management is performed on an individual ID basis. Here, the ID management represents management of a used/unused state of the ID.

The pool resource 5314 stores a specific detail of the ID pool. In the case of the ID pool of "IP address", the pool resource 5314 stores the network address and the default mask length. Further, in the case of the ID pool of "ID", the pool resource 5314 stores the minimum ID and the maximum ID.

FIG. 14 is an explanatory diagram showing an example of the command template information 532 according to the first embodiment.

The command template information 532 includes an ID 5321, a name 5322, and a command template 5323. The command template information 532 is defined across the entire network system, and is used by the plurality of tenant patterns.

The ID 5321 is an identifier for uniquely identifying the command template. The name 5322 is name information on the command template.

The command template 5323 is information storing the command template. The command template has a format that allows a parameter to be substituted into a command or an instruction string. The management server 500 generates a predetermined command by substituting the parameter into the command of the command template 5323.

In the example of FIG. 14, the command template having the name 5322 "delete ACL" is stored in the entry whose ID 5321 is "2". The command template is "unset policy id <ID>", in which an <ID> part is the parameter. The management server 500 substitutes a predetermined ID into <ID> to generate the command.

Next, a description is made of the tenant instance information 533. The tenant instance information 533 includes the tenant instance information (node) 5331 for managing information relating to the node of the tenant instance, the tenant instance information (subnet) 5332 for managing information relating to the subnet of the tenant instance, and the tenant instance information (mapping) 5333 for managing information relating to the mapping between the node of the tenant instance and the physical device. The respective pieces of information are described below.

FIG. 15 is an explanatory diagram showing an example of the tenant instance information (node) 5331 according to the first embodiment.

The tenant instance information (node) 5331 includes a tenant instance ID 53311, a node 53312, a node instance 53313, a configuration item 53314, a parameter 53315, and a parameter value 53316.

The tenant instance ID 53311 is an identifier for uniquely identifying the instance of each tenant. The node 53312 is information for identifying the node defined in the tenant pattern.

The node instance 53313 is information for identifying the node of the tenant instance. In a case where a multiplicity is set for the VM in the tenant pattern, a plurality of node instances are generated for one node.

In the example shown in FIG. 15, because the multiplicity 52803 is set to "3" in the tenant pattern information 528, three node instances 53332 "tVM 1-1", "tVM 1-2", and "tVM 1-3" are generated for the node 53312 "VM 1".

The configuration item 53314 is the configuration item of each node within the tenant instance. The parameter 53315 is an identification name of the parameter included in the configuration item. The parameter value 53316 is the value of the parameter selected at the time of the design of the tenant.

FIG. 16 is an explanatory diagram showing an example of the tenant instance information (subnet) 5332 according to the first embodiment.

The tenant instance information (subnet) 5332 includes a tenant instance ID 53321, a subnet ID 53322, a VLAN ID 53323, a member node 53324, and a network address 53325.

The tenant instance ID 53321 is an identifier for uniquely identifying a tenant instance. The subnet ID 53322 is an identifier for uniquely identifying the subnet within the tenant instance.

The VLAN ID 53323 is a VLAN ID assigned to the subnet. The member node 53324 is information on the node belonging to the subnet. The network address 53325 is a network address assigned to the subnet.

FIG. 17 is an explanatory diagram showing an example of the tenant instance information (mapping) 5333 according to the first embodiment.

The tenant instance information (mapping) 5333 includes a tenant instance ID 53331, a node instance 53332, and a mapped physical device 53333.

The tenant instance ID 53331 is an identifier for uniquely identifying a tenant instance. The node instance 53332 is information for identifying the node being the mapping source, in other words, the node within the tenant instance.

The mapped physical device 53333 is information for identifying the physical device being the mapping destination. It should be noted that in a case where the node instance is a VM, the mapped physical device 53333 for the VM stores the information on a tentative VM, a virtual SW for coupling the VM, and the physical server including the virtual SW. This is because there may be a VM that is not deployed on the physical server 200 at the time of the design of the network.

FIG. 18 is an explanatory diagram showing an example of the physical topology information 536 according to the first embodiment.

The physical topology information 536 includes a device 5361, a model 5362, a management IP address 5363, and a Telnet account 5364.

The device 5361 is an identifier for uniquely identifying a device within the network system. The model 5362 is the model of the physical device. It should be noted that in the case of the virtual device, no information is stored in the model 5362.

The management IP address 5363 is IP address information for management on the access destination used for collecting information from the device and performing a configuration for the device. The Telnet account 5364 is information relating to a Telnet account and a password that are authentication information used for performing the configuration for the device. It should be noted that the physical device may be accessed by using SSH or the like instead of Telnet, and in that case, information on an SSH account is retained.

FIG. 19 is an explanatory diagram showing an example of the design and configuration task information 537 according to the first embodiment.

The design and configuration task information 537 includes an ID 5371, a design date/time 5372, a design detail 5373, a used tenant pattern 5374, a tenant instance ID 5375, and a configuration detail 5376.

The ID 5371 is an identifier for uniquely identifying a design and configuration task.

The design date/time 5372 is a date/time at which the design of the tenant is completed by the execution of the design and configuration task. The design detail 5373 is a design detail of the tenant generated by the execution of the design and configuration task.

The used tenant pattern 5374 is information for identifying the tenant pattern used at the execution of the design and configuration task. The used tenant pattern 5374 stores the identifier of the tenant pattern.

The tenant instance ID 5375 is information for uniquely identifying the tenant instance generated by the execution of the design and configuration task. The configuration detail 5376 is the configuration detail of the tenant generated by the execution of the design and configuration task.

Next, a description is made of a user interface for setting each piece of information.

Figure 20:
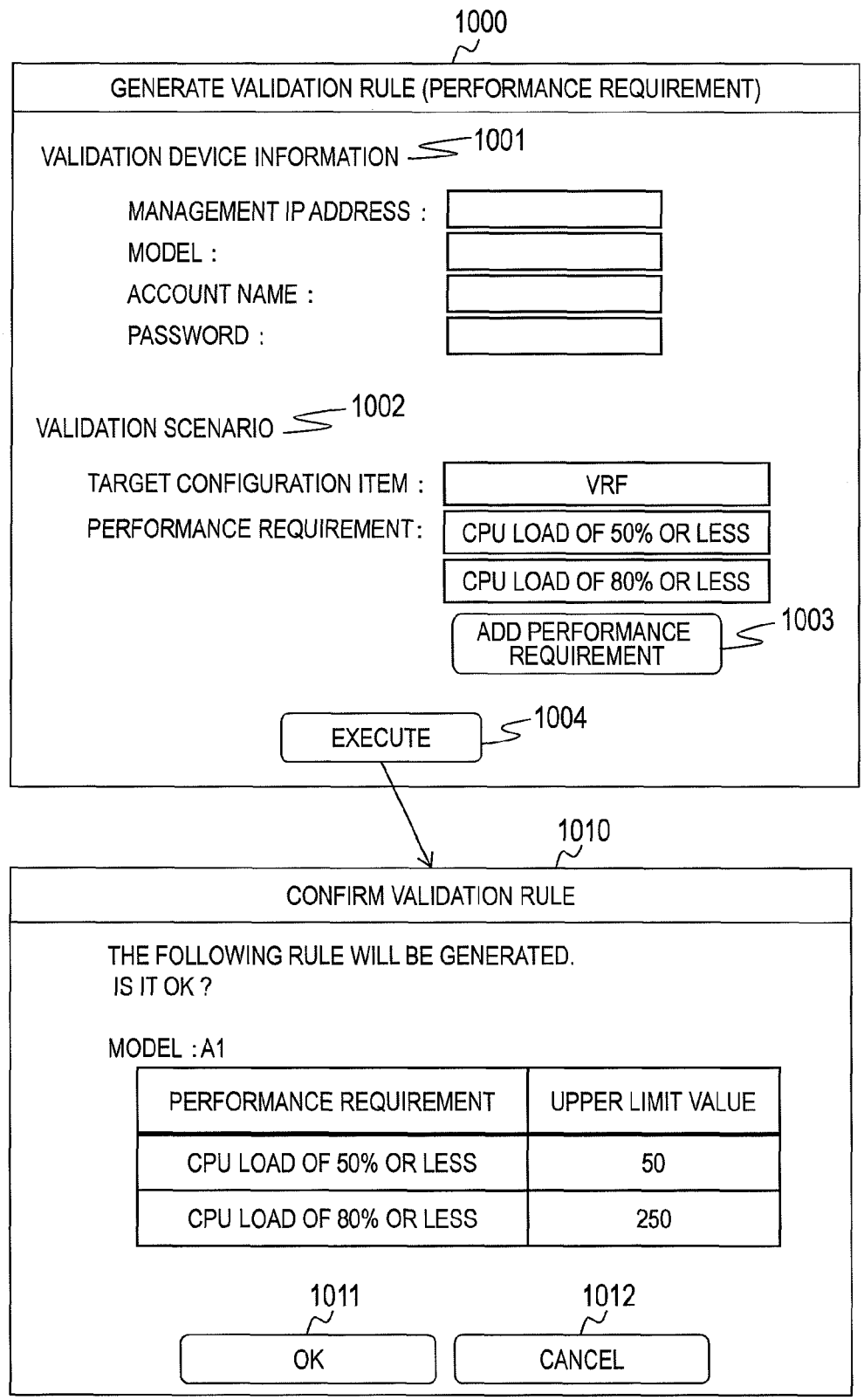
FIG. 20 is an explanatory diagram illustrating an example of a user interface for generating a validation rule according to the first embodiment.
Figure 21A:
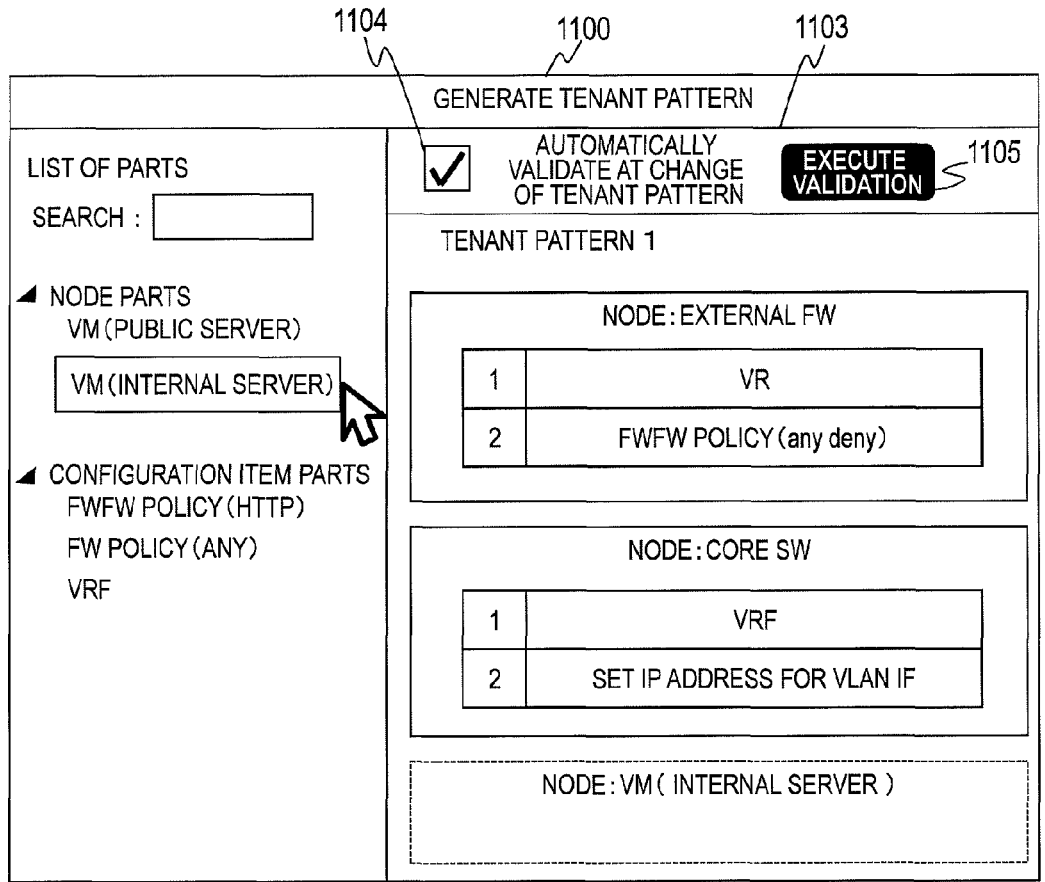
FIG. 21A is an explanatory diagram illustrating an example of a user interface for generating a tenant pattern according to the first embodiment.
Figure 21B:
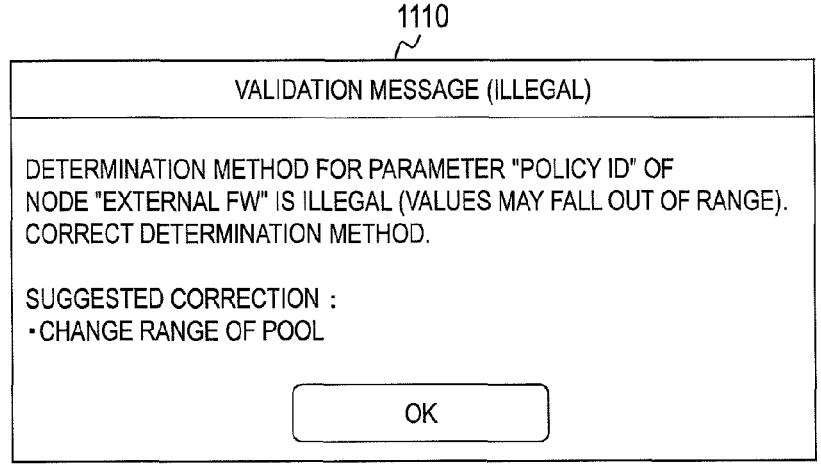
FIG. 21B is an explanatory diagram illustrating an example of a user interface for displaying a validation result according to the first embodiment.
Figure 22:
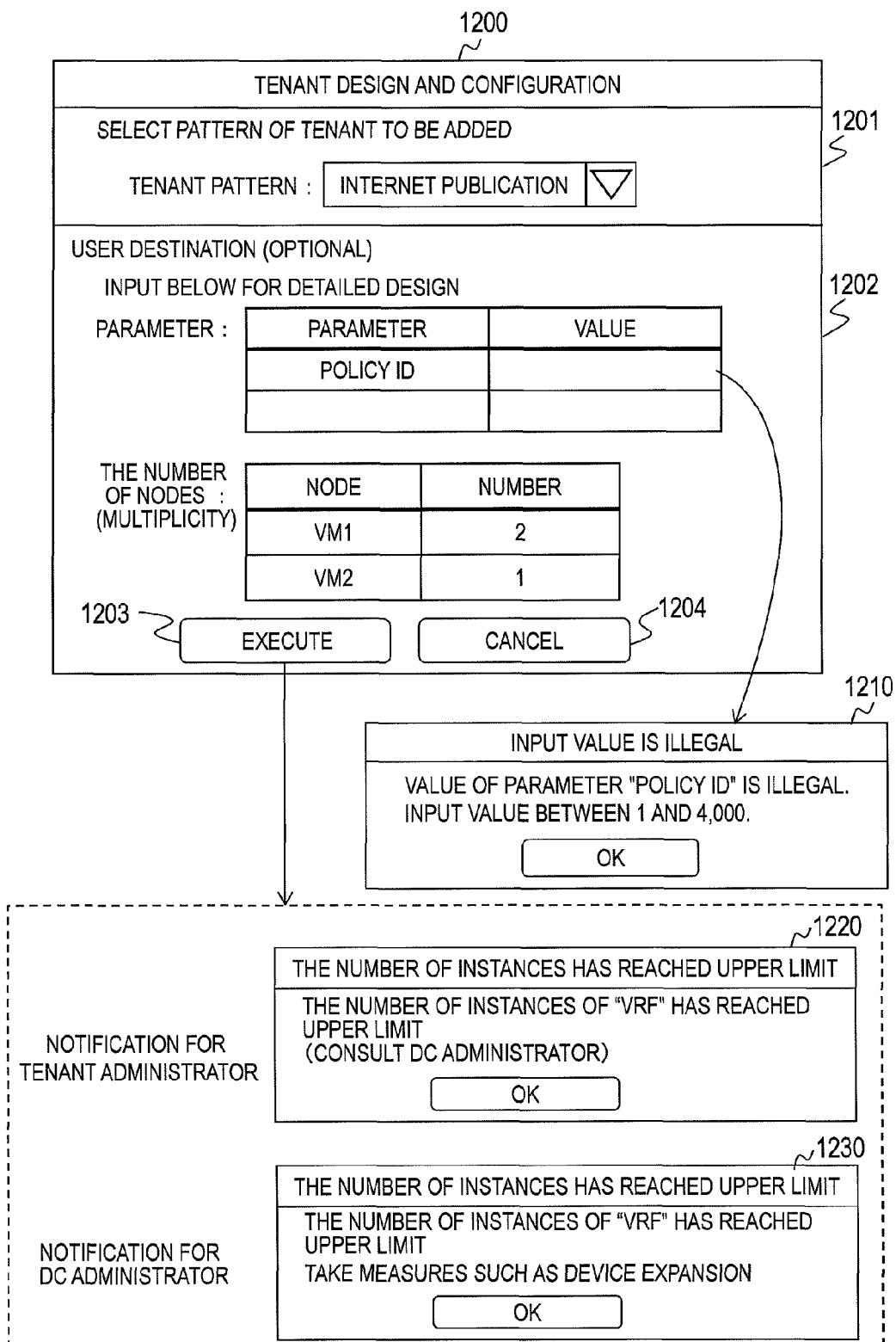
FIG. 22 is an explanatory diagram illustrating an example of a user interface for design and configuration of a tenant according to the first embodiment.

FIG. 20 is an explanatory diagram illustrating an example of a user interface for generating the validation rule according to the first embodiment. FIG. 21A is an explanatory diagram illustrating an example of a user interface for generating the tenant pattern according to the first embodiment. FIG. 21B is an explanatory diagram illustrating an example of a user interface for displaying a validation result according to the first embodiment. FIG. 22 is an explanatory diagram illustrating an example of a user interface for the design and configuration of the tenant according to the first embodiment.

An information input screen 1000 illustrated in FIG. 20 is used when the network SE generates the validation rule "upper limit of the number of instances". It should be noted that the information input screen 1000 is a screen image displayed on the output device of the terminal 700 for the SE.

The information input screen 1000 includes a validation device information input area 1001, a validation scenario input area 1002, and an "execute" button 1004.

The validation device information input area 1001 is an area for inputting the information on the validation device 150. Examples of the information on the validation device 150 include a management IP address, a model, an account name, and a password.

The validation scenario input area 1002 is an area for inputting the details of a validation scenario. The details of the validation scenario include the target configuration item and the performance requirement. It should be noted that a plurality of performance requirements can be input, and hence the validation scenario input area 1002 includes an "add performance requirement" button 1003. The network SE can add a necessary number of performance requirements by operating the "add performance requirement" button 1003.

The "execute" button 1004 is an operation button for instructing generation of the validation rule "upper limit of the number of instances" based on the information input to the validation device information input area 1001 and the validation scenario input area 1002.

In the embodiment, when the network SE operates the "execute" button 1004, the target configuration item is set for a validation device, and the performance requirement check scenario information 521 corresponding to the input performance requirements is used to check the performance. A generation method for the validation rule is described later in detail with reference to FIG. 25A.

When the "execute" button 1004 is operated, a validation rule confirmation screen 1010 is displayed for the network SE. The network SE refers to the validation rule confirmation screen 1010 to confirm settings of the validation rule. In the example illustrated in FIG. 20, it is understood that the upper limit value of the number of instances of the VRF is "50" in the performance requirement "CPU load of 50% or less".

When the network SE operates a "cancel" button 1012, the generation of the validation rule is canceled. On the other hand, when the network SE operates an "OK" button 1011, the validation rule "upper limit of the number of instances" having the display details is generated, and the information relating to the generated validation rule "upper limit of the number of instances" is added to the validation rule information 5251.

FIG. 20 illustrates the user interface used when the validation rule is generated by using the validation device 150, but also in a case of another kind of generation method such as "generation based on existing tenant pattern" or "generation based on manual", a similar information input screen and a similar validation rule confirmation screen are provided.

A tenant pattern generation screen 1100 illustrated in FIG. 21A is used when the network SE generates the tenant pattern by using the pattern parts. It should be noted that the tenant pattern generation screen 1100 is a screen image displayed on the output device of the terminal 700 for the SE.

As illustrated in FIG. 21A, a list of the pattern parts stored in the management server 500 is displayed on a left pane 1101 of the tenant pattern generation screen 1100. Further, the tenant pattern being generated is displayed on a right pane 1102 of the tenant pattern generation screen 1100, and the node and the configuration item of the node are displayed.

To add the pattern part to the tenant pattern, the network SE drags and drops the pattern part displayed on the left pane 1101 onto the right pane 1102 or onto the node displayed on the right pane 1102, to thereby add the node or the configuration item for the node, respectively.

For example, when the network SE drags and drops the node part "VM (internal server)" on the left pane 1101 onto the right pane 1102, such a node as displayed at the bottom of the right pane 1102 is added. Further, when the network SE drags and drops the configuration item part "FW policy (any)" on the left pane 1101 onto "node: external FW" on the right pane 1102, the entry of the FW policy is added to an inside of "node: external FW".

There is an input area 1103 relating to validation processing at the top of the right pane 1102. When the network SE ticks a checkbox 1104 within the input area 1103, the management server 500 executes the relating validation processing each time the tenant pattern is edited. Further, when the network SE operates an "execute validation" button 1105 with the checkbox 1104 unticked, the validation processing is executed by the management server 500.

The management server 500 executes the validation processing, and when it is determined that the validation processing has resulted in illegality, a dialogue 1110 for notification of the validation result exhibiting the illegality is displayed as illustrated in FIG. 21B. The dialogue 1110 presents the validation result exhibiting the illegality in the tenant pattern and a suggested correction to the network SE.

As described above, the network SE can easily generate the tenant pattern by using the pattern parts, and can further confirm an error in the generated tenant pattern by validating the details of the generated tenant pattern.

A tenant design and configuration screen 1200 illustrated in FIG. 22 is used when the tenant administrator designs the tenant to be newly added. It should be noted that the tenant design and configuration screen 1200 is a screen image displayed on the output device of the terminal 900 for the tenant administrator.

The tenant design and configuration screen 1200 includes a tenant pattern selection area 1201 and a user designation area 1202.

The tenant administrator selects a predetermined tenant pattern from the tenant patterns displayed in the tenant pattern selection area 1201 in order to configure the tenant to be added. In the example illustrated in FIG. 22, the tenant patterns are displayed as a pull-down menu in the tenant pattern selection area 1201.

When there is no particular requirement, only by selecting the tenant pattern selection area 1201, the tenant administrator can perform the design and configuration of the tenant without considering the details relating to the network. In this manner, even the tenant administrator without expertise knowledge about the network can perform the design and configuration of the network without an error.

On the other hand, when the selected tenant pattern includes the parameter having the determination method defined as "designated by use", or when a multiplicity is set for the node, the user designation area 1202 is displayed.

When the parameter value is input and the validation rule "parameter value range" is applied to the parameter in the user designation area 1202, the management server 500 executes the validation processing for the input parameter value. The validation processing is described later in detail with reference to FIG. 30A.

Figure 30A:
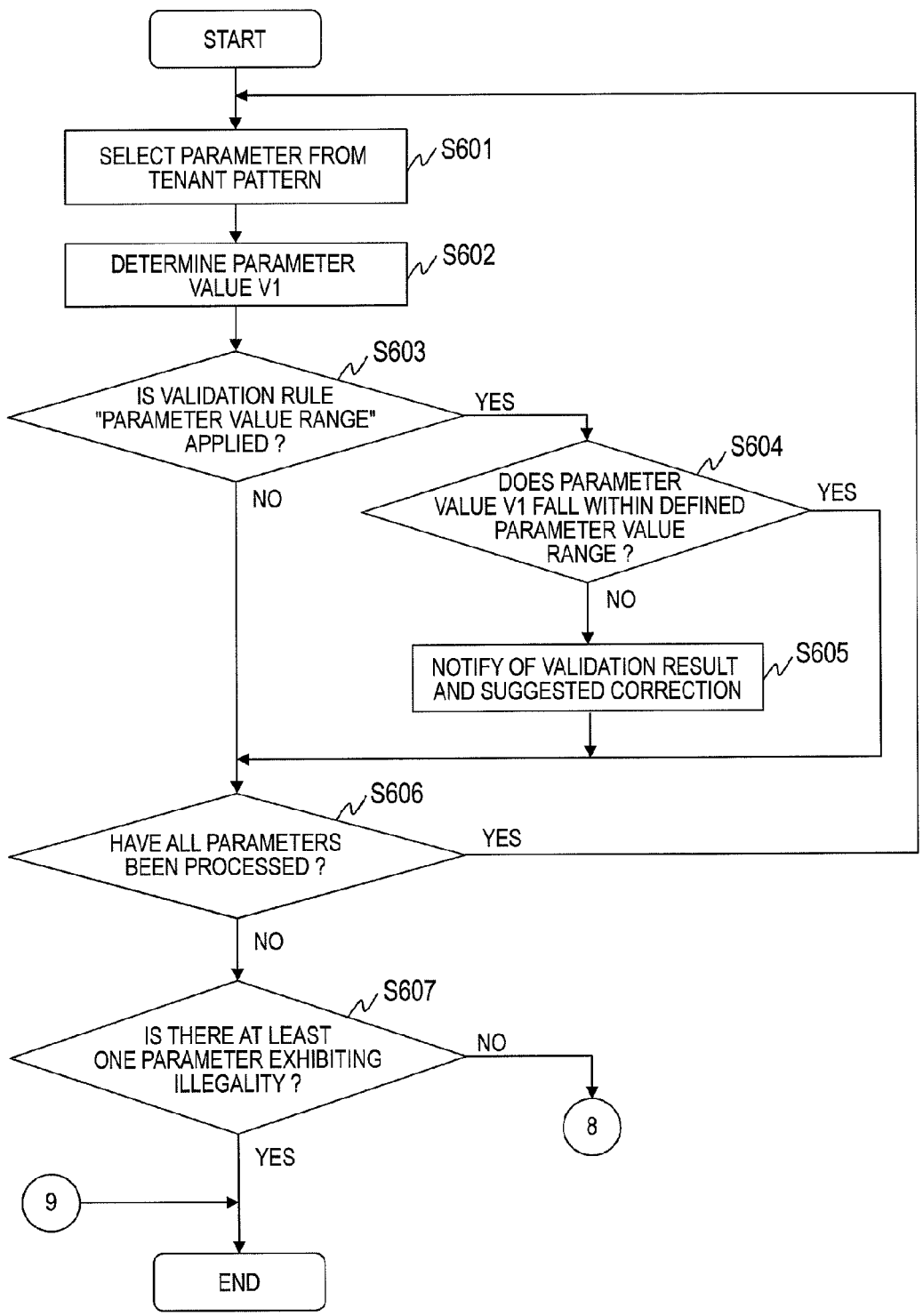
FIG. 30A and FIG. 30B are a flowchart illustrating an example of determination processing for a parameter value and generation processing for a configuration detail according to the first embodiment.

It should be noted that in processing illustrated in FIG. 30A, the validation rule "parameter value range" is collectively validated after an "execute" button 1203 is operated, but the processing of Step S601 to Step S606 may be executed at a time point when the parameter value is input.

When it is determined that the validation processing has resulted in illegality, a screen 1210 for notifying that the input value is illegal is displayed. The screen 1210 for notifying that the input value is illegal presents the parameter value range that can be input.

After the "execute" button 1203 is operated, the validation is performed for the validation rule "upper limit of the number of instances" and the validation rule "composition assumption". The validation processing is described later in detail with reference to FIG. 30B.

When it is determined that the validation processing has resulted in illegality, screens 1220 and 1230 for notification of the illegality are displayed for the tenant administrator and the DC administrator, respectively.

The tenant administrator cannot handle the illegality in the upper limit value of the number of instances, and hence the DC administrator needs to handle the illegality. Therefore, the tenant administrator and the DC administrator are notified of the information having details different from each other. Further, before the upper limit value of the number of instances is reached, for example, at a time point when the number of instances of a predetermined node becomes close to the upper limit value of the number of instances, the management server 500 may notify the DC administrator that the number of instances is not close to the upper limit value of the number of instances.

Figure 23:
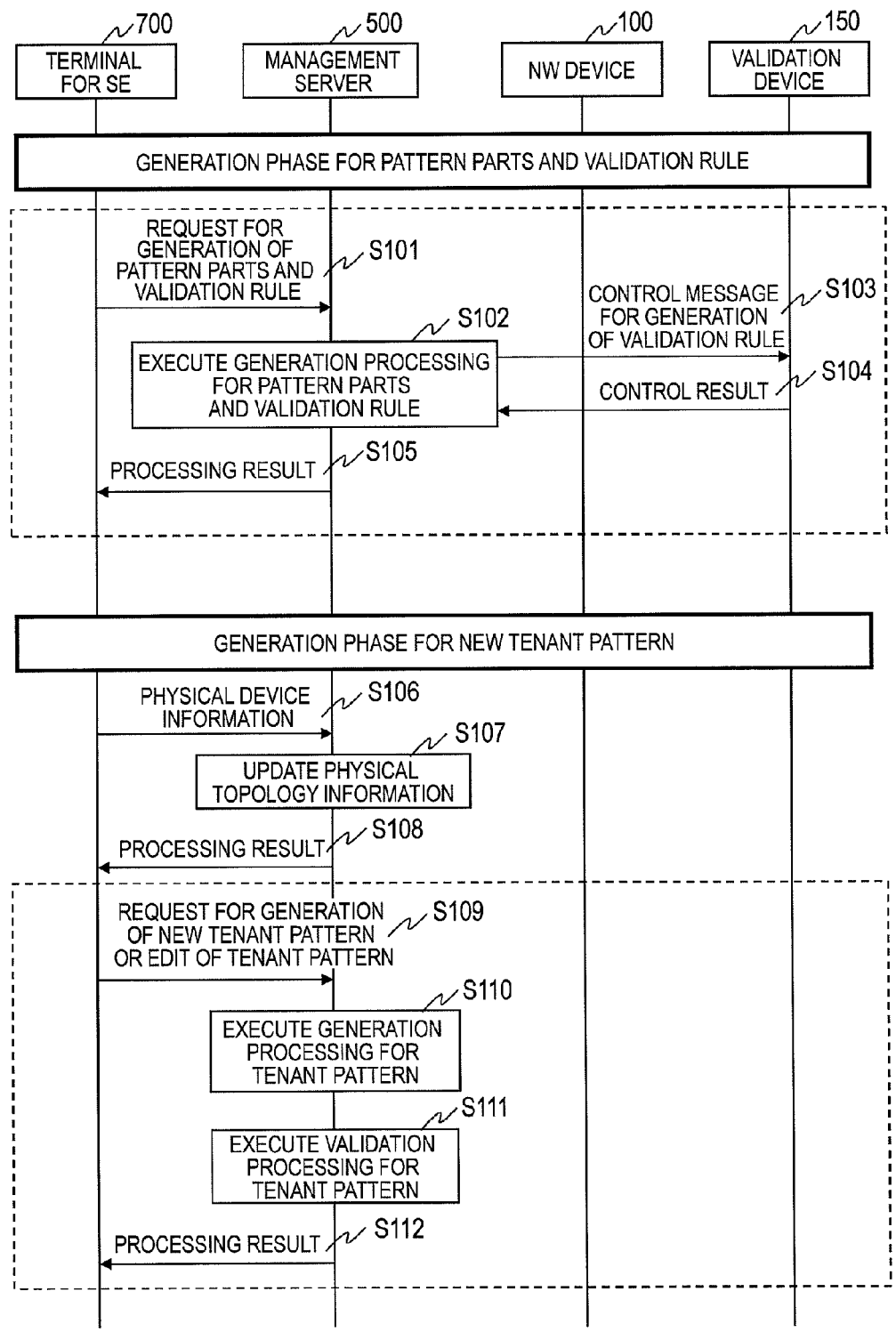
FIG. 23 is a sequence diagram illustrating an example of flows of generation processing for pattern parts and the validation rule and generation processing for the tenant pattern, which are performed in a network system according to the first embodiment.

FIG. 23 is a sequence diagram illustrating an example of flows of generation processing for the pattern parts and the validation rule and generation processing for the tenant pattern, which are performed in the network system according to the first embodiment. FIG. 24 is an explanatory diagram illustrating an example of messages transmitted/received among the devices at the execution of the generation processing for the pattern parts and the validation rule and the generation processing for the tenant pattern according to the first embodiment.

The processing of Step S101 to Step S105 is processing under a generation phase for the pattern parts and the validation rule.

First, the terminal 700 for the SE transmits a request for generation of the pattern parts and the validation rule to the management server 500 (Step S101).

In a case of receiving the request for the generation, the management server 500 executes the generation processing for the pattern parts and the validation rule based on a kind of a generation method for the pattern parts and the validation rule included in the request for the generation (Step S102). The generation processing for the pattern parts and the validation rule is described later with reference to FIG. 25A.

At this time, in a case where the kind of the generation method for the pattern parts and the validation rule is "generation based on validation device", the management server 500 transmits a control message for generation of the validation rule to the validation device 150 (Step S103). The control message includes a performance check command shown in FIG. 3. The validation device 150 returns the string being a control result in response to the control message to the management server 500 (Step S104).

The management server 500 transmits a processing result of the generation processing of Step S102 to the terminal 700 for the SE (Step S105). The processing result includes the generated pattern parts and validation rule.

The processing of Step S101 to Step S105 is repeatedly executed by the number of pattern parts or validation rules to be generated.

The processing of Step S106 to Step S112 is processing under a generation phase for a new tenant pattern.

First, the terminal 700 for the SE inputs physical device information to the management server 500 (Step S106). The physical device information is information whose details are shown in FIG. 18 and which is necessary to configure the NW device 100.

The management server 500 updates the physical topology information 536 based on the received physical device information (Step S107). Specifically, the received physical device information is stored in the physical topology information 536.

The management server 500 transmits a result of the processing for updating the physical topology information 536 to the terminal 700 for the SE (Step S108).

The terminal 700 for the SE transmits a request for the generation of the new tenant pattern or the edit of the tenant pattern to the management server 500 (Step S109). The request includes the pattern parts used at a time of the generation or edit of the tenant pattern, the performance requirement for determining the specific upper limit value of the number of instances for the validation rule "upper limit of the number of instances", and the information necessary for the generation of the tenant pattern.

The management server 500 generates the tenant pattern based on the requested details (Step S110). The generation processing for the tenant pattern is described later in detail with reference to FIG. 26.

The management server 500 executes the validation processing for the tenant pattern after generating the tenant pattern or after editing the tenant pattern (Step S111). The validation processing for the tenant pattern is described later in detail with reference to FIG. 27A, FIG. 27B, and FIG. 27C.

The management server 500 transmits a processing result of the validation processing for the tenant pattern to the terminal 700 for the SE (Step S112). The processing result includes a result of the generation processing for the tenant pattern and a result of the validation processing for the tenant pattern. Further, the result of the validation processing for the tenant includes a portion determined to be "illegal" and the suggested correction for the portion.

The processing of Step S109 to Step S112 is repeatedly executed until the edit of the tenant pattern is finished or until there is no portion determined to be illegal.

Messages shown in FIG. 24 indicate transmission sources, transmission destinations, and details of the messages transmitted/received in Step S101 to Step S112.

Figure 25A:
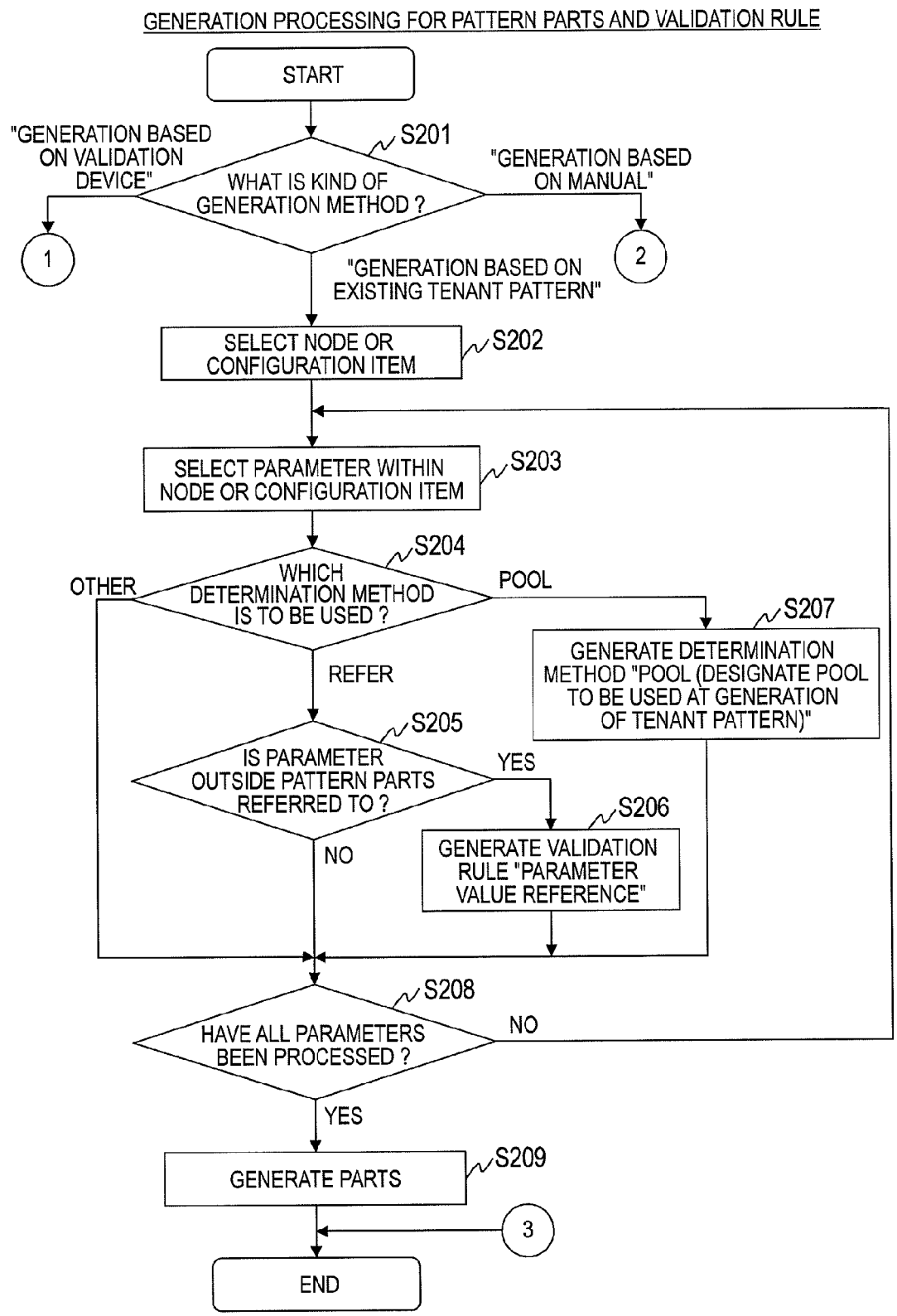
FIG. 25A, FIG. 25B, and FIG. 25C are a flowchart illustrating an example of the generation processing for the pattern parts and the validation rule according to the first embodiment.
Figure 25B:
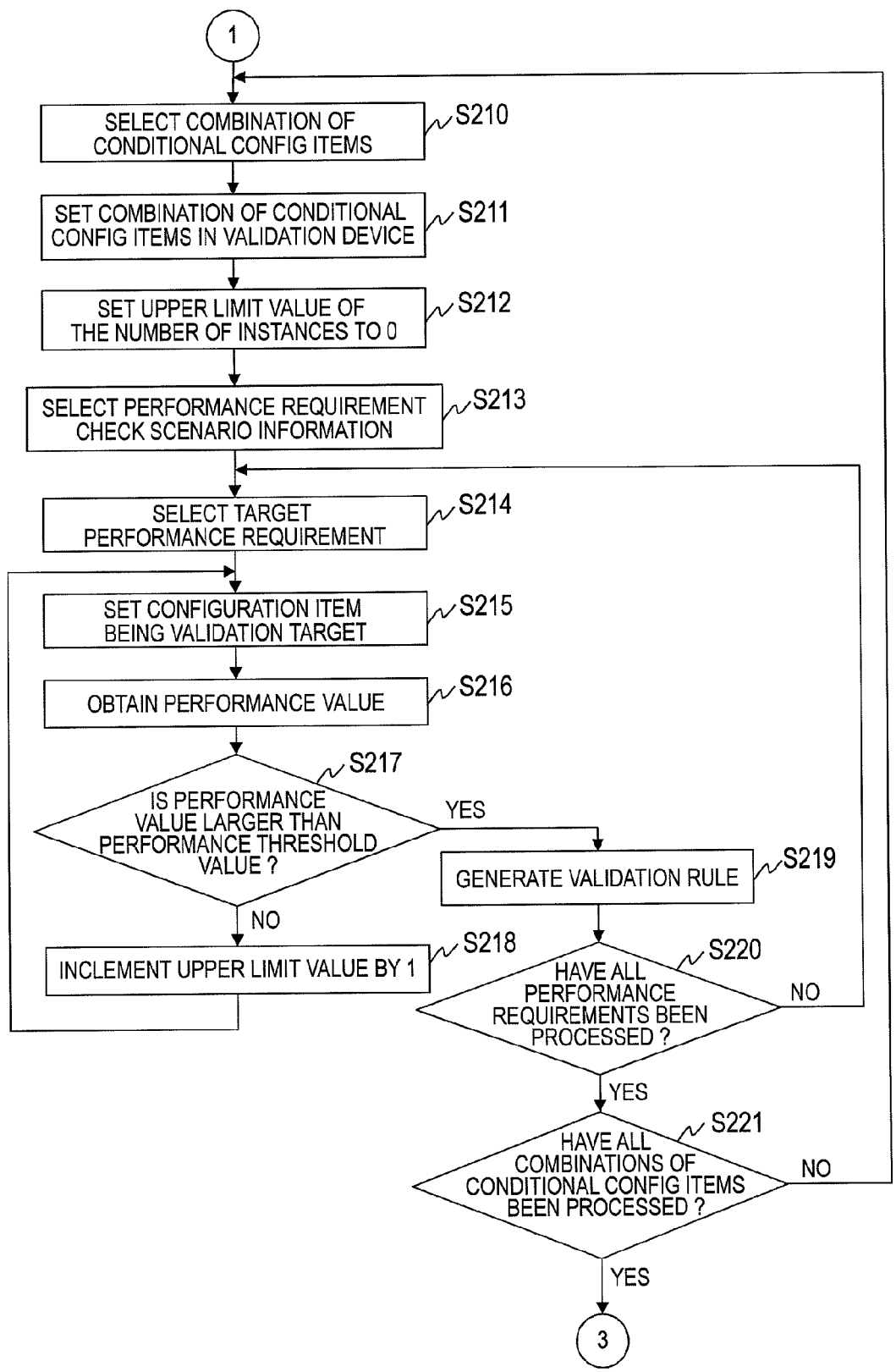
Figure 25C:
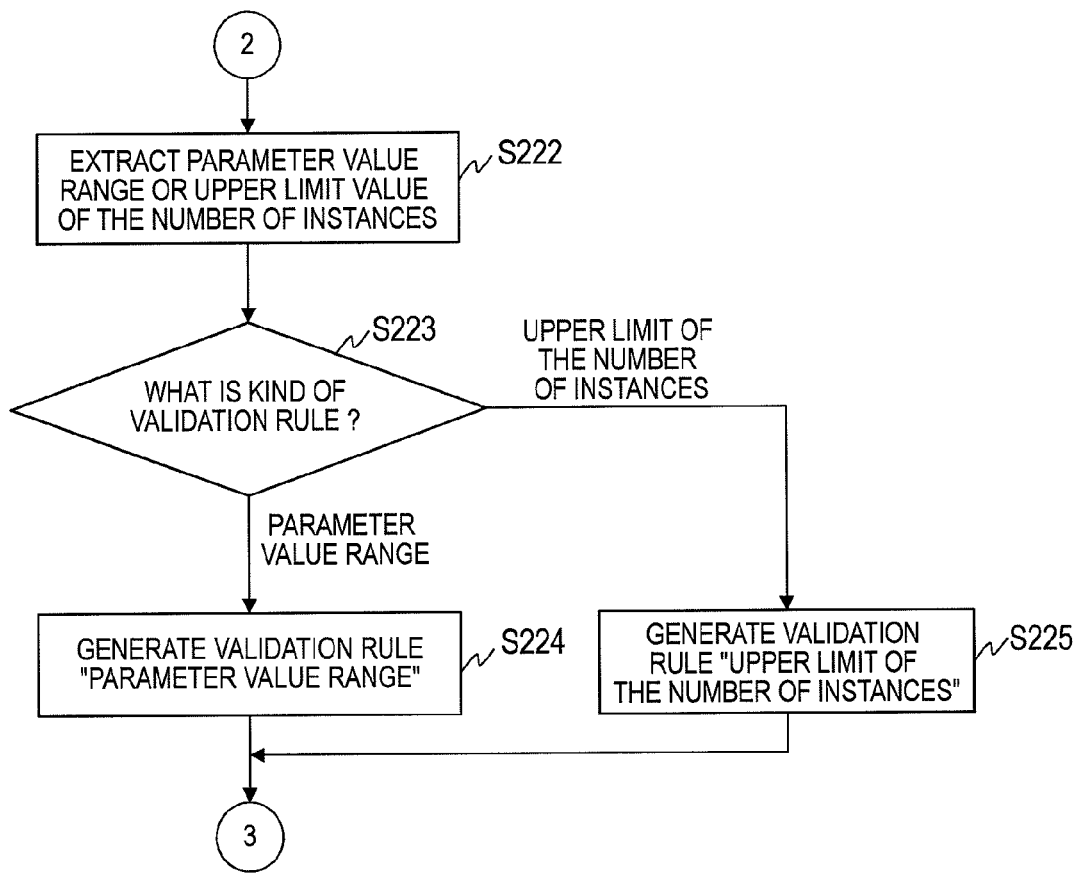

FIG. 25A, FIG. 25B, and FIG. 25C are a flowchart illustrating an example of the generation processing for the pattern parts and the validation rule according to the first embodiment.

This flowchart illustrates the example of the generation processing for the pattern parts and the validation rule executed in Step S102 of FIG. 23.

The management server 500 determines the kind of the generation method included in the request for the generation received from the terminal 700 for the SE (Step S201).

In a case where it is determined that the kind of the generation method is "generation based on validation device", such processing as illustrated in FIG. 25B is executed. In a case where it is determined that the kind of the generation method is "generation based on manual", such processing as illustrated in FIG. 25C is executed.

It should be noted that as shown in FIG. 24, the information included in the request for the generation differs depending on the kind of the generation method. In the case of the "generation based on existing tenant pattern", the request for the generation includes a list of nodes or configuration items to be a pattern parts conversion target. In the case where the generation method is "generation based on validation device", the request for the generation includes the model of the validation device, a list of conditional config items, the configuration item being the validation target, and the performance requirement. Here, the performance requirement is such information as shown in the performance requirement 52522 of FIG. 8. Further, in the case where the generation method is the "generation based on manual", the request for the generation includes the kind of the validation rule to be generated, the kind of the configuration item, an extraction string ID, and information on the manual.

In a case where it is determined that the kind of the generation method is the "generation based on existing tenant pattern", the management server 500 selects the node or the configuration item to be the pattern parts conversion target (Step S202).

Specifically, the management server 500 refers to the list of the nodes or configuration items to be the pattern parts conversion target included in the request for the generation, to thereby select the node or the configuration item to be the pattern parts conversion target from the list.

The management server 500 selects the parameter included in the selected node or configuration item (Step S203).

Specifically, the management server 500 refers to tenant pattern information 528 to select one parameter from the parameters 52809 of the entry corresponding to the selected node or configuration item.

The management server 500 determines the determination method for the selected parameter (Step S204).

Specifically, the management server 500 refers to the determination method 52810 corresponding to the selected parameter 52809 to determine the determination method for the selected parameter. Here, it is determined which of "refer", "pool", and a determination method other than "refer" or "pool" the determination method for the parameter is.

In a case where it is determined that the determination method is the determination method other than "refer" or "pool", the management server 500 advances to Step S208.

In a case where it is determined that the determination method is "pool", the management server 500 generates "pool (designate pool to be used at generation of tenant pattern)" (Step S207), and advances to Step S208.

By this processing, for example, such a determination method as shown in the determination method 52308 of the entry whose parameter ID 52306 is "parameter 101" in FIG. 5 is generated.

In a case where it is determined that the determination method is "refer", the management server 500 determines whether or not the parameter value is to be determined by referring to another parameter included in the node or configuration item other than the pattern parts conversion target (Step S205).

For example, in a case where the parameter 52809 of the node 52802 "FW 1" is "destination" in FIGS. 10A and 10B, the network address of the subnet 3 different from the FW 1 is referred to. Therefore, the management server 500 determines that the parameter value is to be determined by referring to another parameter included in the node or configuration item other than the pattern parts conversion target.

In a case where it is determined that the condition of Step S205 is not satisfied, the management server 500 advances to Step S208.

In a case where it is determined that the condition of Step S205 is satisfied, the management server 500 generates the entry corresponding to the validation rule "parameter value reference" in the validation rule information 5251 (Step S206), and advances to Step S208.

Specifically, the management server 500 sets the identifier of the parameter selected in Step S203 in the validation target 52514 of the generated entry, and sets the parameter type tag 52811 of the parameter of the reference target in the validation rule detail 52513 "referential target".

The management server 500 determines whether or not all the parameters included in the selected node or configuration item have been processed (Step S208).

In a case where it is determined that not all the parameters have been processed, the management server 500 returns to Step S203.

In a case where it is determined that all the parameters have been processed, the node or configuration item selected as the pattern parts conversion target is generated as one pattern part (Step S209), and the processing is brought to an end.

Specifically, the management server 500 generates a new entry in the pattern parts information (configuration item) 523, and stores necessary information in the entry. It should be noted that the generated entry stores the information on the entry corresponding to the selected node or configuration item within the tenant pattern information 528.

In a case where it is determined in Step S201 that the generation method is "generation based on validation device", the management server 500 selects a combination of the conditional config items (Step S210).

Specifically, the management server 500 refers to the list of the conditional config items included in the request for the generation to select the combination of the conditional config items. It should be noted that at least one conditional config item is assumed to be included in the combination of the conditional config items. Further, in a case where there is only one conditional config item included in the list of the conditional config items, the combination including the conditional config item is assumed to be selected.

The management server 500 sets the selected combination of the conditional config items in the validation device 150 (Step S211).

Specifically, the management server 500 identifies the validation device 150 to be used for the validation processing based on the model of the validation device included in the request for the generation. In addition, the management server 500 sets the selected combination of the conditional config items in the identified validation device 150.

The management server 500 sets the upper limit value of the number of instances to "0" (Step S212), and selects performance requirement check scenario information based on the performance requirement included in the request for the generation (Step S213).

Specifically, the management server 500 searches for the entry in which the type of the performance requirement included in the request for the generation matches the performance requirement 5212 of the performance requirement check scenario information 521.

The management server 500 selects a target performance requirement from the performance requirements included in the request for the generation (Step S214), and further sets the configuration item being the validation target in the validation device 150 (Step S215).

The management server 500 uses the selected performance requirement check scenario information to obtain the performance value from the validation device 150 (Step S216).

The management server 500 determines whether or not the obtained performance value is larger than the value of the performance requirement included in the request for the generation (Step S217).

In a case where it is determined that the obtained performance value is equal to or smaller than the value of the performance requirement included in the request for the generation, the management server 500 increments the upper limit value by one (Step S218), and returns to Step S215.

In a case where it is determined that the obtained performance value is larger than the value of the performance requirement included in the request for the generation, the management server 500 generates the validation rule "upper limit of the number of instances" based on the combination of the conditional config items and the current upper limit value of the number of instances (Step S219). Specifically, the following processing is executed.

The management server 500 generates a new entry in each of the validation rule information 5251 and the validation rule detail information (upper limit value) 5252.

The management server 500 stores a predetermined identifier in the validation rule ID 52511, and further stores "upper limit of the number of instances" in the validation rule kind 52512. The management server 500 stores, in the validation rule detail 52513, the information indicating that the upper limit value exists in the configuration item, and stores the identifier of the configuration item in the validation target 52514. It should be noted that the identifier of the configuration item is assumed to be automatically assigned by the management server 500. The management server 500 stores, in the model 52516, the model of the validation device included in the request for the generation, and stores, in the parameter value 52517, the selected combination of the conditional config items and the upper limit value of the number of instances.

It should be noted that when the corresponding entry has already been generated, the management server 500 adds new information to the parameter value 52517 of the entry.

In addition, the management server 500 stores the same identifier as the validation rule ID 52511 in the validation rule ID 52521, and stores, in the performance requirement 52522, the performance requirement included in the request for the generation. The management server 500 stores a predetermined identifier in the precondition ID 52523. The management server 500 stores specific details of combinations of the selected conditional config items in the conditional config items 52524 and 52525.

The processing of Step S218 has been described above. By this processing, for example, the validation rule whose validation rule ID is "2" in FIG. 7 is generated.

Subsequently, the management server 500 determines whether or not all the performance requirements have been processed for the selected combination of the conditional config items (Step S220).

For example, in a case where the performance requirement included in the request for the generation uses the upper limit value 1 and the upper limit value 2 as the targets, it is determined whether or not the processing has been completed for the upper limit value 1 and the upper limit value 2. In a case where only the upper limit value 1 has been processed, the management server 500 determines that not all the performance requirements have been processed.

In a case where it is determined that not all the performance requirements have been processed for the selected combination of the conditional config items, the management server 500 returns to Step S214.

In a case where it is determined that all the performance requirements have been processed for the selected combination of the conditional config items, the management server 500 determines whether or not the processing has been finished for all the combinations of the conditional config items (Step S221).

In a case where it is determined that the processing has not been finished for all the combinations of the conditional config items, the management server 500 returns to Step S210. In a case where it is determined that the processing has been finished for all the combinations of the conditional config items, the management server 500 brings the processing to an end.

In a case where it is determined in Step S201 that the generation method is the "generation based on manual", the management server 500 uses the extraction string information 522 to extract the parameter value range or the upper limit value of the number of instances from the manual included in the request for the generation (Step S222). At this time, information on the model or the like being the target of the manual is also extracted. It should be noted that in the case where the validation rule included in the request for the generation is the validation rule "parameter value range", the parameter value is extracted, and in the case of "upper limit of the number of instances", the upper limit value of the number of instances is extracted.

The management server 500 determines the kind of the validation rule included in the request for the generation (Step S223).

In a case where it is determined that the kind of the validation rule included in the request for the generation is the validation rule "parameter value range", the management server 500 uses the extracted parameter value range to generate the validation rule "parameter value range" (Step S224), and brings the processing to an end. Specifically, the following processing is executed.

The management server 500 generates a new entry in the validation rule information 5251, stores a predetermined identifier in the validation rule ID 52511 of the entry, and stores "parameter value range" in the validation rule kind 52512.

The management server 500 stores information relating to the parameter value range extracted in the validation rule detail 52513 of the generated entry. The management server 500 stores, in the validation target 52514, the identifier of the configuration item included in the request for the generation.

In addition, the management server 500 stores the information on the model extracted from the manual in the model 52516, and stores the extracted parameter value range in the parameter value 52517.

The processing of Step S224 has been described above. By this processing, for example, the validation rule whose validation rule ID is "1" in FIG. 7 is generated.

In a case where it is determined that the kind of the validation rule included in the request for the generation is the validation rule "upper limit of the number of instances", the management server 500 uses the extracted upper limit value of the number of instances to generate the validation rule "upper limit of the number of instances" (Step S225), and brings the processing to an end.

As the processing of Step S225, the same processing as Step S223 is executed. It should be noted that the information stored in the device information 52515 differs.

As described above, according to the embodiment, the pattern parts and the validation rule can be easily generated. Further, as described later, the operator can easily generate the tenant pattern by using the pattern parts and the validation rule.

Figure 26:
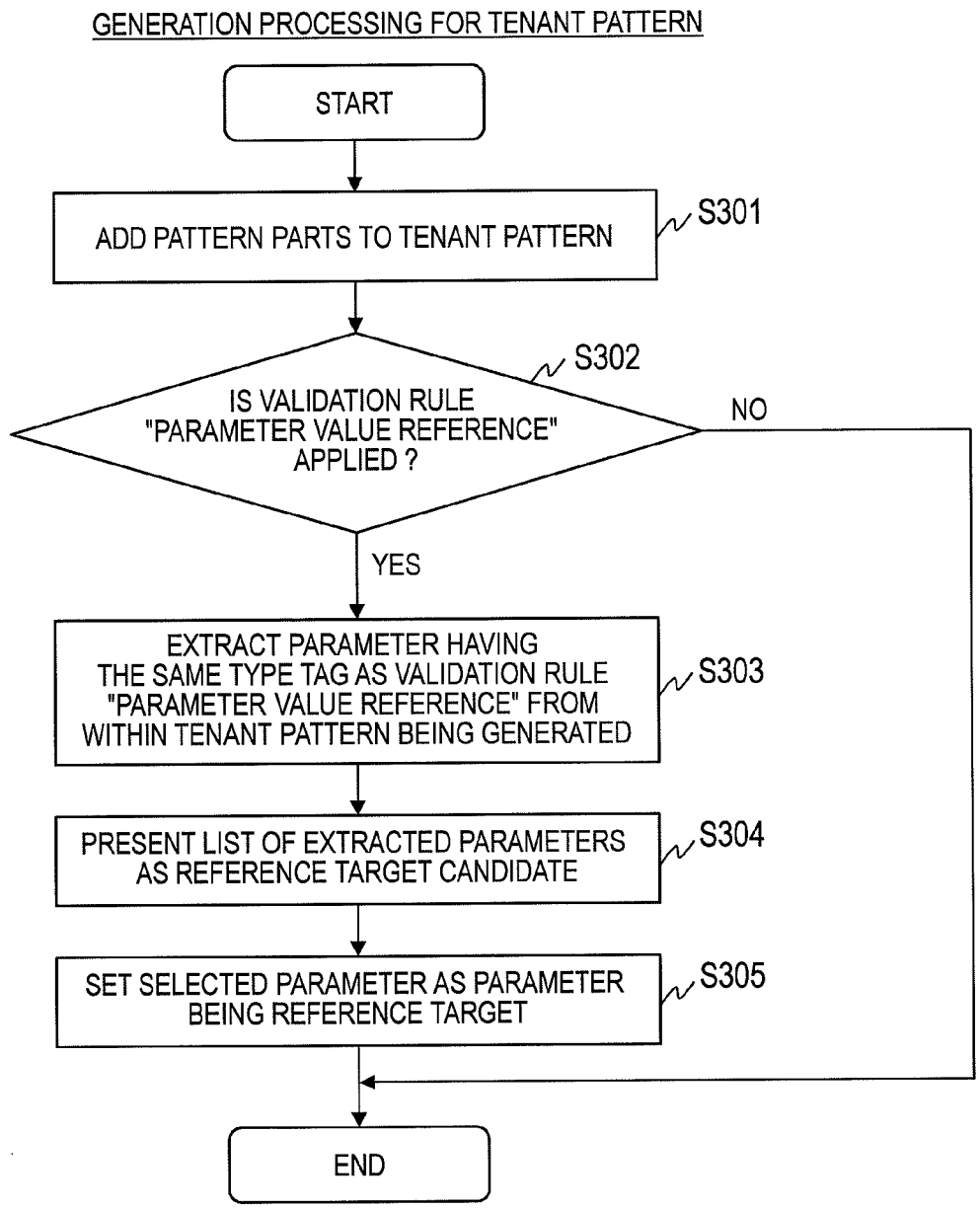
FIG. 26 is a flowchart illustrating an example of the generation processing for the tenant pattern using the pattern parts according to the first embodiment.

FIG. 26 is a flowchart illustrating an example of the generation processing for the tenant pattern using the pattern parts according to the first embodiment.

This flowchart illustrates the example of the generation processing for the tenant pattern executed in Step S110 of FIG. 23.

Each time the network SE selects the pattern part, the generation processing for the tenant pattern is executed. Further, the generation processing for the tenant pattern is processing for supporting the network SE in generating a definition indicating the reference between the parameters by using the validation rule "parameter value reference".

The management server 500 adds the pattern parts selected by the network SE to the tenant pattern (Step S301). Specifically, the following processing is executed.

The management server 500 adds a new entry to the tenant pattern information, and stores, in the tenant pattern ID 52801, the identifier of the tenant pattern to which the pattern part is to be added. The management server 500 refers to the pattern parts information (configuration item) 523 to obtain the entry corresponding to the pattern parts selected by the network SE. The management server 500 stores the necessary information in each column of the newly-added entry based on the information on the obtained entry.

The processing of Step S301 has been described above. It should be noted that the network SE uses such a user interface as illustrated in FIG. 21A to request the addition of the pattern parts to the tenant pattern.

Subsequently, the management server 500 determines whether or not the validation rule "parameter value reference" is applied to the selected pattern part (Step S302). Specifically, the following processing is executed.

The management server 500 refers to the validation rule information 5251 based on the parameter ID 52306 of the entry obtained from the pattern parts information (configuration item) 523 in Step S301.

The management server 500 searches for the entry in which the value stored in the validation target 52514 matches the parameter ID 52306. The management server 500 determines whether or not the validation rule kind 52512 of the retrieved entry is "parameter value reference".

The processing of Step S302 has been described above.

In a case where it is determined that the validation rule "parameter value reference" is not is not applied to the selected pattern part, the management server 500 brings the processing to an end.

In a case where it is determined that the validation rule "parameter value reference" is applied to the selected pattern part, the management server 500 extracts the parameter having the same parameter type tag as "referential target" defined by the validation rule detail 52513 from within the tenant pattern being generated (Step S303).

Specifically, the management server 500 refers to the tenant pattern information 528, searches the entries corresponding to the tenant pattern being generated, for the entry whose parameter type tag 52811 matches the parameter type tag of "referential target" defined by the validation rule detail 52513.

The management server 500 presents a list of the extracted parameters to the network SE as a reference target candidate (Step S304). The network SE selects the parameter of the reference target from the list of the parameters presented as the reference target candidate.

The management server 500 sets the parameter selected by the network SE as the reference target of the parameter being the validation target to which the validation rule is applied (Step S305), and brings the processing to an end.

Specifically, the management server 500 stores "refer" and the identifier of the selected parameter in the determination method 52308 of the entry added to the tenant pattern.

Figure 27A:
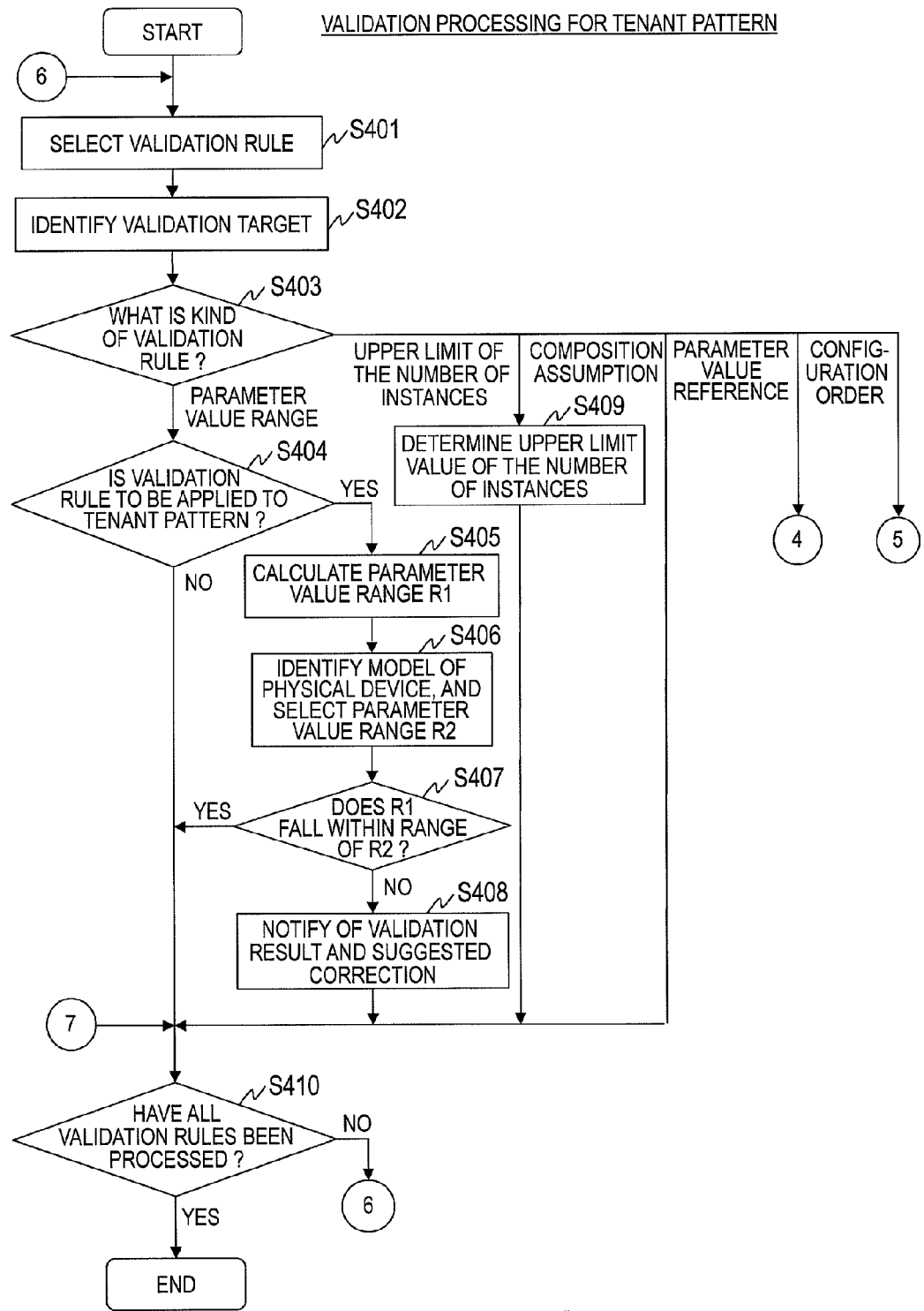
FIG. 27A, FIG. 27B, and FIG. 27C are a flowchart illustrating an example of the tenant pattern validation processing according to the first embodiment.
Figure 27B:
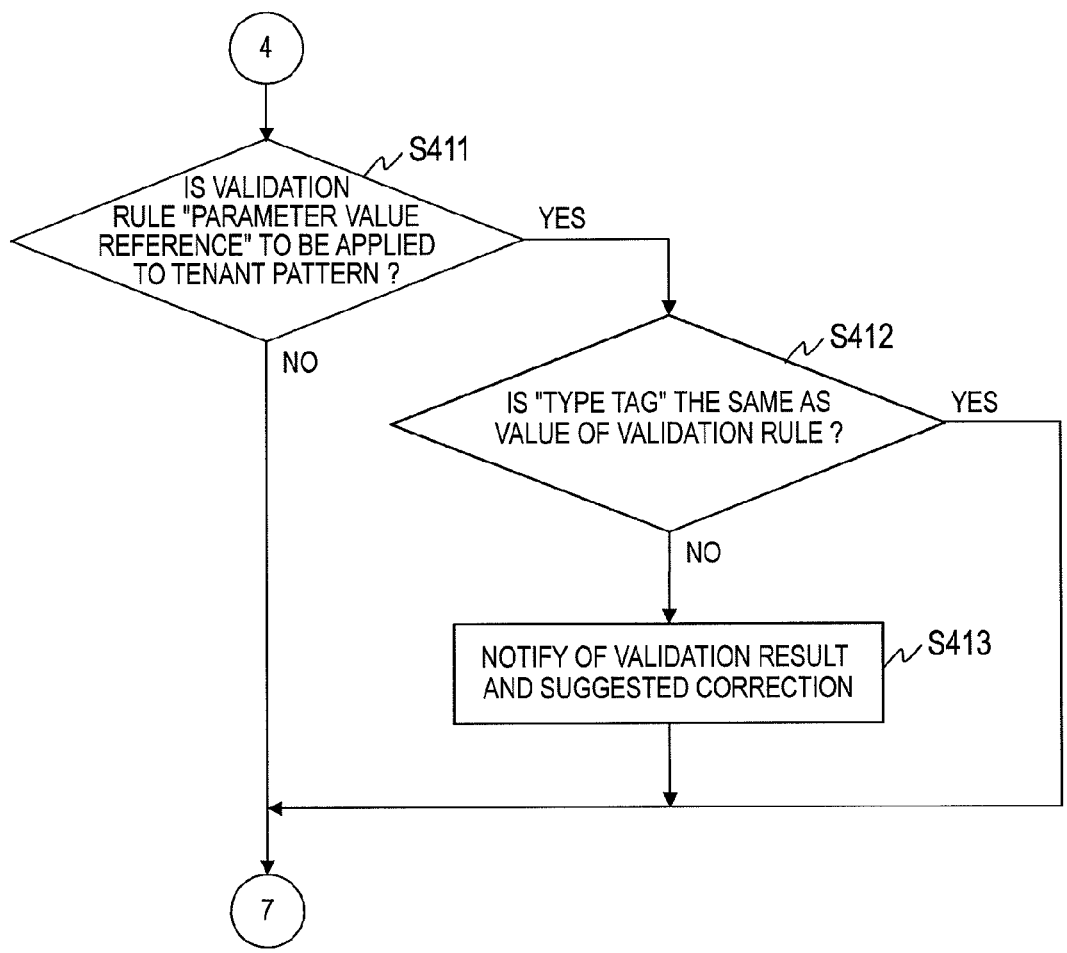
Figure 27C:
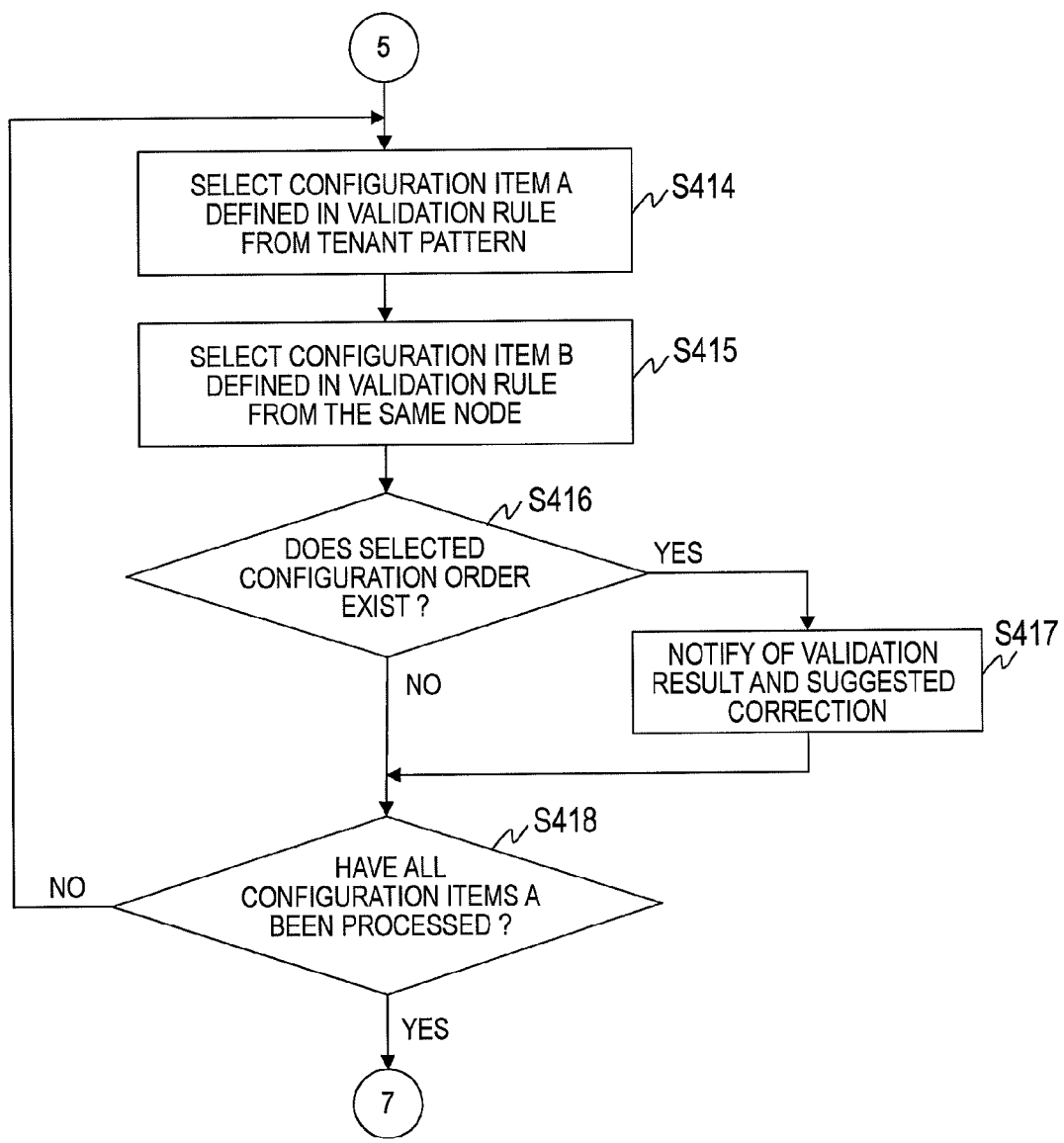

FIG. 27A, FIG. 27B, and FIG. 27C are a flowchart illustrating an example of the tenant pattern validation processing according to the first embodiment.

This flowchart illustrates the example of the tenant pattern validation processing in Step S111 of FIG. 23. In FIG. 21A, when the checkbox 1104 is ticked or when the network SE operates the "execute validation" button 1105, this processing is executed. At this time, the identifier of the target tenant pattern is input to the management server 500.

The management server 500 selects the validation rule from within the validation rule information 5251 (Step S401). It is assumed here that the entries are selected in order from the top. It should be noted that the entry that has been selected once is removed from selection targets.

The management server 500 identifies the pattern part to which the selected validation rule is applied (Step S402). Specifically, the following processing is executed.

The management server 500 refers to the validation rule information 5251 to obtain the validation target 52514 of the entry corresponding to the selected validation rule. The management server 500 refers to the tenant pattern information 528 based on the obtained validation target 52514 to identify the pattern parts. Here, an identification method differs depending on the information stored in the validation target 52514 as follows.

In a case where the obtained validation target 52514 is the identifier of the pattern part, the management server 500 refers to the tenant pattern information 528 to identify the entry whose tenant pattern ID 52801 matches the identifier of the target tenant pattern. The management server 500 searches the identified entries for the entry whose pattern parts ID 52807 matches the obtained validation target 52514.

In a case where the obtained validation target 52514 is the identifier of the parameter, the management server 500 refers to the pattern parts information (configuration item) 523 to search for the pattern part including the parameter whose parameter ID 52306 matches the obtained validation target 52514. Accordingly, the pattern parts ID 52301 is obtained. The management server 500 refers to the tenant pattern information 528 to identify the entry whose tenant pattern ID 52801 matches the identifier of the target tenant pattern. The management server 500 searches the identified entries for the entry of the pattern part whose pattern parts ID 52807 matches the obtained pattern parts ID 52301.

It should be noted that in the cases of the validation rule "parameter value range" and the validation rule "parameter value reference", the pattern part is identified from the identifier of the parameter, and in the cases of the validation rule "upper limit of the number of instances" and the validation rule "composition assumption", the pattern part is identified from the identifier of the pattern part. In the case of the validation rule "configuration order", the validation target 52514 is blank, and hence the processing of Step S402 is not executed.

The processing of Step S402 has been described above. By this processing, the pattern part (node or configuration item) being the validation target is identified. It should be noted that when there are a plurality of pattern parts identified, a list of the identified pattern parts, for example, a list of the pattern parts IDs 52807 is output. Further, it is assumed that an empty list is output when there is no pattern part identified, in other words, when the validation rule is not to be applied to the target tenant pattern.

Subsequently, the management server 500 determines the kind of the selected validation rule (Step S403).

Specifically, the management server 500 refers to the validation rule kind 52512 of the entry corresponding to the selected validation rule to determine the selected kind of the validation rule.

In a case where the validation rule "parameter value reference" is selected, the processing illustrated in FIG. 27B is executed. In a case where the validation rule "configuration order" is selected, the processing illustrated in FIG. 27C is executed. In a case where the validation rule "composition assumption" is selected, the management server 500 advances to Step S410.

In a case where the validation rule "upper limit of the number of instances" is selected, the management server 500 determines the upper limit value of the number of instances of the pattern part (configuration item) (Step S409) based on the performance requirement 52522 defined in the validation rule, and advances to Step S410. The determined upper limit value of the number of instances of the pattern part (configuration item) is stored in the upper limit value 52808 of the number of instances within the tenant pattern information 528.

Further, in a case where the conditional config item 52524 for determining the upper limit value is defined, the management server 500 determines whether or not the configuration item 52804 corresponding to the conditional config item 52524 is included in the tenant pattern information 528 on the validation target. In the determination processing, when the same configuration item type tag 52805 as the conditional config item 52524 is present, it is determined that the configuration item 52804 corresponding to the conditional config item 52524 is included in the tenant pattern information 528. The management server 500 determines the upper limit value based on a combination of the included conditional config items.

It should be noted that when there are a plurality of validation targets (node or configuration item) identified, the processing of Step S409 is repeatedly executed.

In a case where the validation rule "parameter value range" is selected, the management server 500 determines whether or not the validation rule is to be applied to the pattern part (node or configuration item) of the target tenant pattern (Step S404). In other words, the management server 500 determines whether or not the selected validation rule "parameter value range" is the validation rule to be applied to the target tenant pattern.

Specifically, the management server 500 determines whether or not an output result of Step S402 is an empty list. In a case where the output result of Step S402 is an empty list, the management server 500 determines that the selected validation rule "parameter value range" is not the validation rule to be applied to the target tenant pattern.

In a case where it is determined that the selected validation rule "parameter value range" is not the validation rule to be applied to the target tenant pattern, the management server 500 advances to Step S410.

In a case where it is determined that the selected validation rule "parameter value range" is the validation rule to be applied to the target tenant pattern, the management server 500 calculates a parameter value range R1 of the pattern part identified from the validation target 52514 (Step S405).

Specifically, the management server 500 determines the parameter value range of the pattern part based on the determination method 52810 of the entry of the pattern part identified in Step S402.

For example, the determination method of the parameter 52809 "ACL ID" corresponding to the node 52802 "FW 1" in FIG. 10A is the assignment from the pool 4, and hence the management server 500 refers to the pattern parts information (pool) 524. In the example shown in FIG. 6, a value ranging from 10 to 10,000 can be assigned to the pool 4, and hence the management server 500 calculates the parameter value range R1 as "10" to "10,000".

The management server 500 identifies the model of a configuration mapped physical device, and selects a parameter value range R2 of the identified physical device (Step S406). Specifically, such processing as described below is executed.

The management server 500 refers to the tenant pattern information 528 to obtain the node 52802 including the pattern parts identified in Step S402. The management server 500 refers to the mapping information 530 to search for the entry whose node 5302 matches the obtained node 52802.

The management server 500 refers to the physical topology information 536 based on the physical device 5303 of the retrieved entry to identify the entry corresponding to the physical device. The management server 500 refers to the device information 52515 of the validation rule information 5251 based on the model 5326 of the identified entry to select the parameter value range R2.

For example, in a case where the node 5302 is "FW 1", the physical device 5303 "FW 1" is the physical device to be configured as shown in FIG. 12, and the model 5362 of the device 5361 "FW 1" is "J1" as shown in FIG. 18. Therefore, the management server 500 selects the parameter value 52517 corresponding to the model 52516 "J1" from the device information 52515 of the entry whose validation rule ID 52511 is "1". Accordingly, the parameter value range R2 is set to "1" to "4,000".

The management server 500 determines whether or not the parameter value range R1 falls within a range of the parameter value range R2 (Step S407).

In a case where it is determined that the parameter value range R1 falls within the range of the parameter value range R2, the management server 500 advances to Step S410. This is because it is guaranteed that the parameter value calculated based on the determination method falls within a value range defined in the validation rule.

In a case where it is determined that the parameter value range R1 does not fall within the range of the parameter value range R2, the management server 500 notifies the network SE of the validation result exhibiting the illegality and the suggested correction (Step S408), and advances to Step S410. This is because the parameter value calculated based on the determination method may exceed the parameter value range defined in the validation rule. Therefore, the management server 500 notifies that the generated tenant pattern is illegal.

Here, as the suggested correction to be notified, for example, a suggested correction such as reduction of the "maximum ID" of the ID pool used to determine the parameter value based on the validation rule information 5251 is conceivable.

It should be noted that in the above-mentioned example, the parameter value range R1 ranges from "10" to "10,000", while the parameter value range R2 ranges from "1" to "4,000", and hence the validation result exhibiting the illegality is output.

It should be noted that when there are a plurality of validation targets (node or configuration item) identified, the processing of Step S405 to Step S408 is repeatedly executed.

The management server 500 determines whether or not all the validation rules have been processed (Step S410).

In a case where it is determined that not all the validation rules have been processed, the management server 500 returns to Step S401. In a case where it is determined that all the validation rules have been processed, the management server 500 brings the processing to an end.

In a case where the validation rule "parameter value reference" is selected in Step S403, the management server 500 determines whether or not the validation rule is to be applied to the pattern part (node or configuration item) of the target tenant pattern (Step S411). In other words, it is determined whether or not the selected validation rule "parameter value reference" is the validation rule to be applied to the target tenant pattern. The processing of Step S411 is the same as the processing of Step S404.

In a case where it is determined that the selected validation rule "parameter value reference" is not the validation rule to be applied to the target tenant pattern, the management server 500 advances to Step S410.

In a case where it is determined that the selected validation rule "parameter value reference" is the validation rule to be applied to the target tenant pattern, the management server 500 determines whether or not the parameter type tag 52811 of the parameter of the reference target defined in the determination method for the parameter 52810 corresponding to the validation target 52514 is the same as the value defined in the validation rule detail 52513 (Step S412). Specifically, the following processing is executed.

The management server 500 refers to the determination method for the parameter 52810 corresponding to the validation target 52514 to identify the identifier of another parameter referred to by the parameter being the validation target. The management server 500 searches for the entry whose parameter 52809 matches the identified identifier of the parameter.

The management server 500 determines whether or not the parameter type tag 52811 of the retrieved entry matches the parameter type tag defined in the validation rule detail 52513.

Here, the parameter type tag defined in the validation rule detail 52513 is, for example, the information "public server IP" within the validation rule detail 52513 of the entry whose validation rule ID 52511 is "3" as shown in FIG. 7.

The processing of Step S412 has been described above.

In a case where it is determined that the parameter type tag is the same, the management server 500 advances to Step S410. This is because a proper parameter value reference is maintained. It should be noted that when no value is stored in the parameter type tag 52309 of the parameter of the reference target, the management server 500 cannot perform the validation based on the validation rule, and therefore advances to Step S410.

In a case where it is determined that the parameter type tag is not the same, the management server 500 notifies the network SE of the validation result exhibiting the illegality and the suggested correction (Step S413), and advances to Step S410.

For example, the management server 500 extracts the parameter whose parameter type tag 52811 is the same as the parameter type tag defined in the validation rule detail 52513 from the target tenant pattern based on the validation rule information 5251, and presents a candidate for the target to which the parameter being the validation target refers as the suggested correction.

It should be noted that when there are a plurality of validation targets (node or configuration item) identified, the processing of S411 to S413 is repeatedly executed.

In a case where the validation rule "configuration order" is selected in Step S403, the management server 500 selects the configuration item having the same configuration item type tag as the configuration item A defined in the validation rule detail 52513 from the target tenant pattern (Step S414).

Specifically, the management server 500 refers to the tenant pattern information 528 to identify the entry whose tenant pattern ID 52801 matches the identifier of the target tenant pattern. The management server 500 searches the identified entries for the entry whose configuration item type tag 52805 matches the configuration item type tag of the configuration item A defined in the validation rule detail 52513.

The management server 500 selects the configuration item having the same configuration item type tag as the configuration item B defined in the validation rule detail 52513 from the entry of the node including the configuration item corresponding to the configuration item A retrieved in Step S414 (Step S415).

The management server 500 determines whether or not the selected configuration item exists (Step S416). Specifically, it is determined whether or not the configuration item A and the configuration item B coexist.

In a case where it is determined that the selected configuration item does not exist, the management server 500 advances to Step S418.

In a case where it is determined that the selected configuration item exists, the management server 500 notifies the network SE of the validation result exhibiting the illegality and the suggested correction (Step S417), and advances to Step S418.

As the suggested correction to be notified, for example, it is conceivable to change the configuration order of the configuration items within the tenant pattern in a case where the configuration item A is set after the configuration item B is set based on the validation rule information 5251.

The management server 500 determines whether or not all the configuration items A defined in the validation rule detail 52513 have been processed (Step S418).

In a case where it is determined that not all the configuration items A have been processed, the management server 500 returns to Step S414. In a case where it is determined that all the configuration items A have been processed, the management server 500 advances to Step S410.

As described above with reference to FIG. 27A, FIG. 27B, and FIG. 27C, the network SE can easily generate the tenant pattern by using the pattern parts at the time of the generation of the tenant pattern. Further, the management server 500 can easily generate the tenant pattern having a proper composition by executing the validation processing for the generated tenant pattern. Accordingly, it is possible to realize an increase in efficiency and quality of tenant structuring and changing work.

Figure 28:
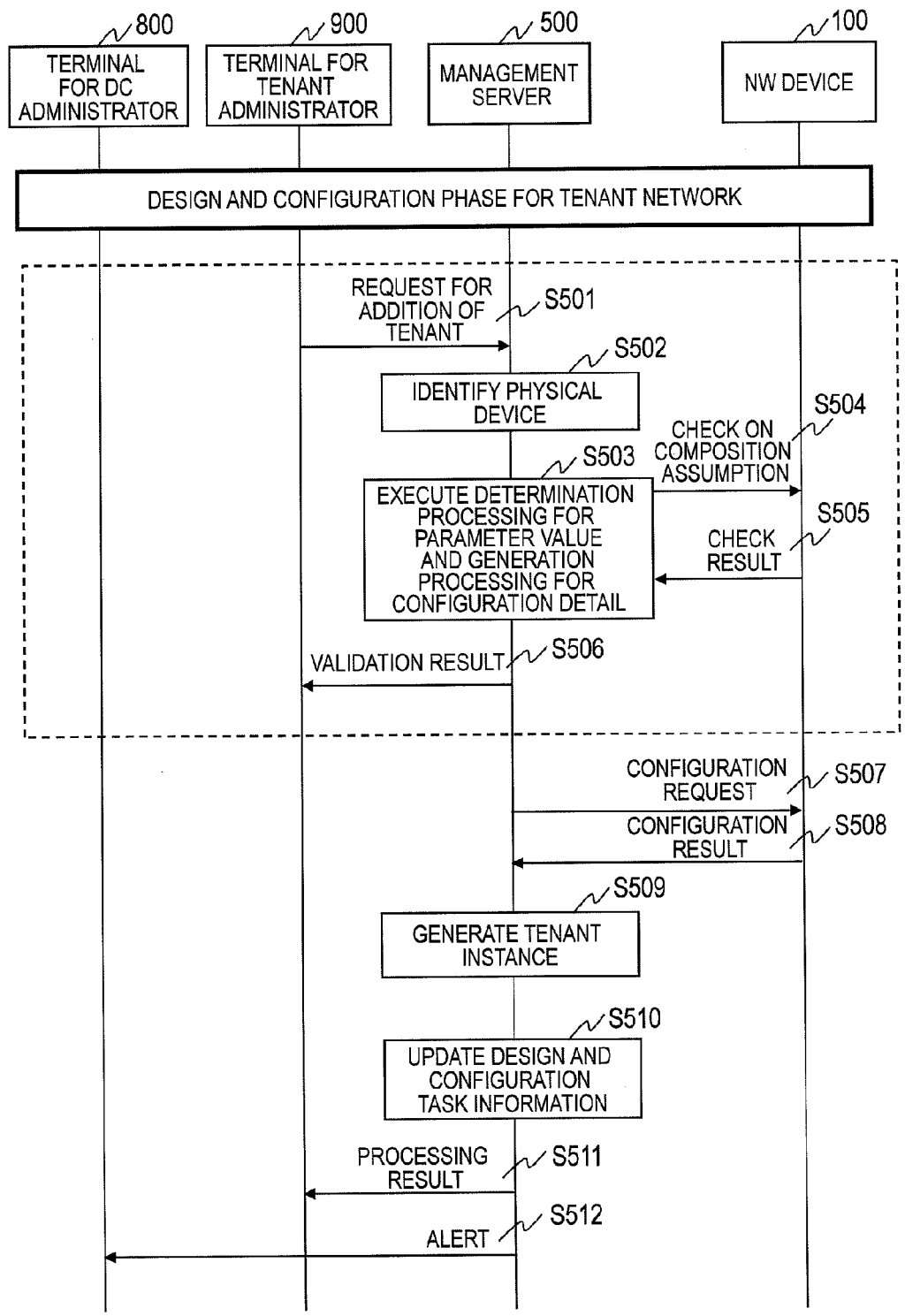
FIG. 28 is a sequence diagram illustrating an example of a flow of network design and configuration processing for the tenant in the network system according to the first embodiment.

FIG. 28 is a sequence diagram illustrating an example of a flow of network design and configuration processing for the tenant in the network system according to the first embodiment. FIG. 29 is a table showing an example of messages transmitted/received among the devices at the execution of the tenant network design and configuration processing according to the first embodiment.

First, the terminal 900 for the tenant administrator transmits a request for addition of a tenant to the management server 500 (Step S501). The request for the addition of the tenant includes at least the identifier of the tenant pattern to be used. It should be noted that when the tenant administrator designates a user input value, the request for the addition of the tenant also includes the user input value.

It should be noted that in the example illustrated in FIG. 28, the request for the addition of the tenant is transmitted from the terminal 900 for the tenant administrator, but the request may be transmitted from the terminal 800 for the DC administrator. In this case, the validation result received in Step S506 and the processing result received in Step S510 are transmitted to the terminal 800 for the DC administrator.

In a case of receiving the request for the addition of the tenant, the management server 500 refers to the mapping information 530 based on the identifier of the tenant pattern included in the request to identify the physical device corresponding to the node within the tenant pattern (Step S502).

Specifically, the management server 500 refers to the mapping information 530 to search for the entry whose tenant pattern ID 5301 matches the identifier of the tenant pattern included in the request for the addition. The management server 500 refers to the node 5302 and the physical device 5303 of the retrieved entry, to thereby identify the physical device corresponding to the node within the tenant pattern.

The management server 500 executes the determination processing for the parameter value for determining the parameter value for the node within the network system and generation processing for the configuration detail based on the determined parameter value (Step S503).

Further, the management server 500 executes the validation processing for the configuration detail during the execution of the generation processing for the configuration detail. At this time, the management server 500 accesses the NW device 100 in order to execute the validation processing based on the validation rule "composition assumption" (Step S504 and Step S505). The determination processing for the parameter value and generation processing for design detail are described later in detail with reference to FIGS. 30A and 30B.

The management server 500 notifies the terminal 900 for the tenant administrator of the validation result (Step S506). The validation result includes the result of the validation processing and a result of processing for the design and configuration.

The processing of Step S501 to Step S506 is repeatedly executed until the validation result exhibiting the illegality is no longer included. For example, when the validation result exhibiting the illegality is output, the tenant administrator changes the user input value input at the time of the design of the tenant to a value within the parameter value range defined in the validation rule.

The management server 500 starts the processing for the configuration after the validation result exhibiting the illegality is no longer output, and transmits a configuration request to the NW device 100 (Step S507).

After receiving the configuration request, the NW device 100 updates the composition information on the NW device 100 itself based on the configuration detail generated in Step S503, and notifies the management server 500 of a configuration result (Step S508).

After receiving the configuration result from all the NW devices 100, the management server 500 generates the tenant instance of the added tenant (Step S509). At this time, the management server 500 stores the information relating to the generated tenant instance in the tenant instance information 533. After that, the management server 500 updates the state of the design and configuration task information 537 (Step S510).

The management server 500 notifies the terminal 900 for the tenant administrator of the processing result (Step S511). Further, the management server 500 transmits an alert to the DC administrator when a current number of instances becomes larger than the upper limit value of the number of instances as a result of the validation processing based on the validation rule "upper limit of the number of instances" in the generation processing for the configuration detail executed in Step S503 (Step S512).

As the detail of the alert, for example, a suggestion such as expansion of the NW device 100 is conceivable because the current number of instances becomes larger than the upper limit value of the number of instances. Further, the management server 500 may notify the DC administrator of the suggestion such as the expansion of the NW device 100 when the number of instances becomes near the upper limit value of the number of instances.

As described above, the management server 500 performs the validation for the parameter value range at the time of the design and configuration of the network for the tenant, performs the validation for the NW configuration necessary for the configuration item added from the validation result, and further performs the validation for the upper limit value of the number of instances corresponding to the performance. Accordingly, it is possible to prevent a failure in the network configuration.

Messages shown in FIG. 29 indicate transmission sources, transmission destinations, and details of the messages transmitted/received in Step S501 to Step S512.

Figure 30B:
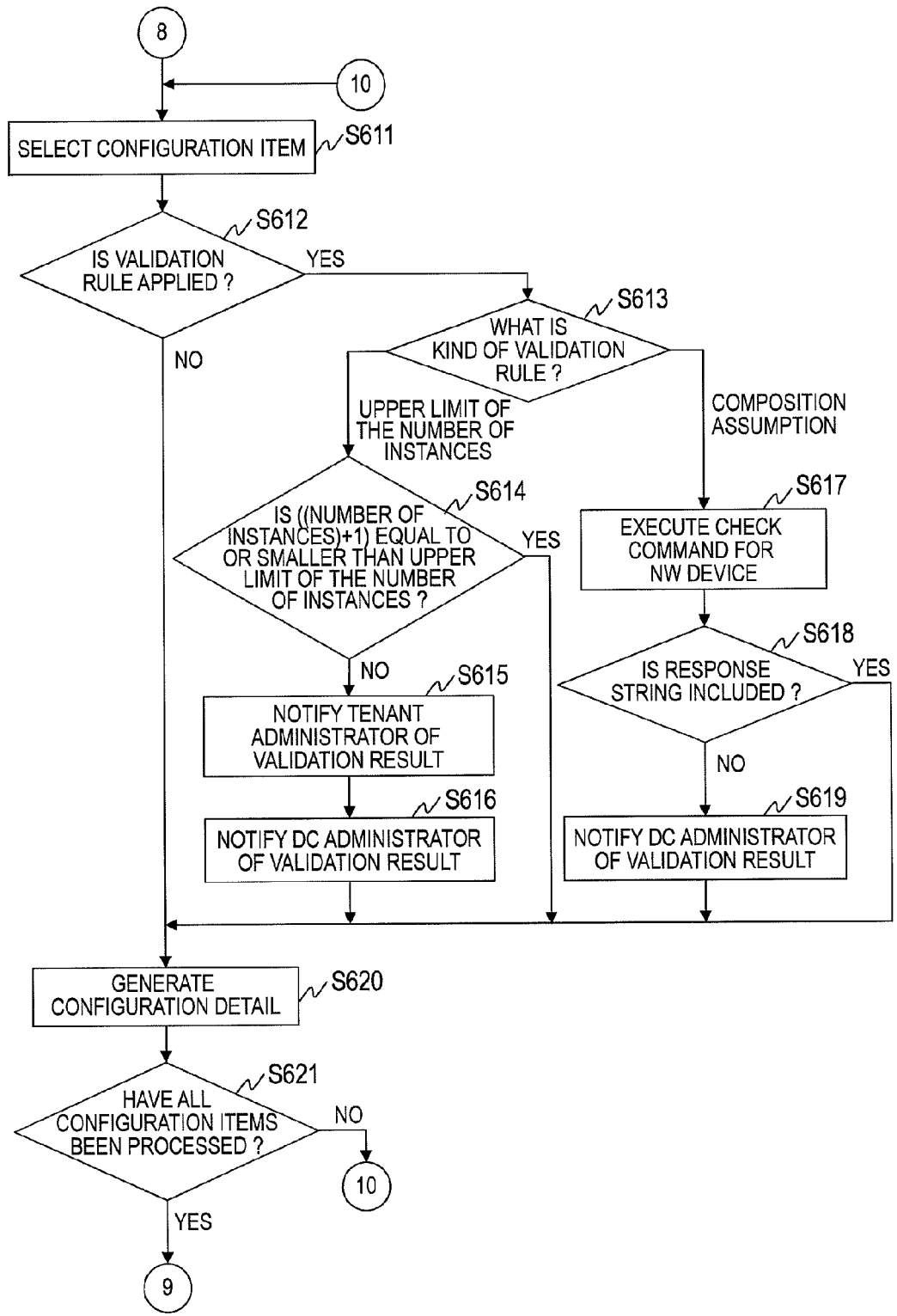

FIG. 30A and FIG. 30B are a flowchart illustrating an example of the determination processing for the parameter value and the generation processing for the configuration detail according to the first embodiment.

This flowchart illustrates the example of the determination processing for the parameter value and the generation processing for the configuration detail executed in Step S503 of FIG. 28.

The management server 500 refers to the tenant pattern information 528 to select the parameter to be processed from among the parameters included in the tenant pattern used when the tenant is added (Step S601). It should be noted that the parameter that has been selected once is removed from selection targets.

The management server 500 determines a parameter value V1 of the selected parameter based on the determination method 52810 of the entry corresponding to the selected parameter (Step S602). It should be noted that as the determination methods for the parameter value, as shown in FIG. 10A and FIG. 10B, there are "refer", "pool", "designated by user", and "fixed".

The management server 500 determines whether or not the validation rule "parameter value range" is applied to the selected parameter (Step S603). Specifically, the following processing is executed.

The management server 500 refers to the validation rule information 5251 to search for the entry whose validation rule kind 52512 is "parameter value range". The management server 500 obtains the identifier of the parameter from the validation target 52514 of the retrieved entry.

The management server 500 refers to the pattern parts information (configuration item) 523 to search for the entry whose parameter ID 52306 matches the obtained identifier of the parameter. The management server 500 obtains the parameter 52307 from the retrieved entry, and determines whether or not the selected parameter matches the parameter 52307.

In a case where the selected parameter matches the parameter 52307, the management server 500 determines that the validation rule "parameter value range" is applied to the selected parameter.

The processing of Step S603 has been described above.

In a case where it is determined that the validation rule "parameter value range" is not applied to the selected parameter, the management server 500 advances to Step S606.

In a case where it is determined that the validation rule "parameter value range" is applied to the selected parameter, the management server 500 determines whether or not the determined parameter value V1 falls within the parameter value range defined in the validation rule "parameter value range" (Step S604). Specifically, the following processing is executed.

The management server 500 refers to the tenant pattern information 528 to identify the node including the selected parameter. The management server 500 identifies the physical device to which the identified node is mapped based on the information on the physical device identified in Step S502.

The management server 500 refers to the device 5361 within the physical topology information 536 to search for the entry corresponding to the identified physical device and obtain the information on the model of the physical device from the model 5362 of the retrieved entry.

The management server 500 refers to the validation rule information 5251 based on the information on the model of the obtained physical device to identify the parameter value range defined in the validation rule "parameter value range". The management server 500 determines whether or not the determined parameter value V1 falls within the identified parameter value range.

The processing of Step S604 has been described above.

In a case where it is determined that the parameter value V1 does not fall within the parameter value range defined in the validation rule "parameter value range", the management server 500 notifies the tenant administrator of the validation result exhibiting the illegality and the suggested correction (Step S605), and advances to Step S606.

In the suggested correction to be notified, for example, the parameter value range defined in the validation rule "parameter value range" applied to the parameter is presented as a value range of the user input value at the time of the design.

In a case where it is determined that the parameter value V1 falls within the parameter value range defined in the validation rule "parameter value range", the management server 500 advances to Step S606.

The management server 500 determines whether or not all the parameters have been processed (Step S606).

In a case where it is determined that not all the parameters have been processed, the management server 500 returns to Step S601.

In a case where it is determined that all the parameters have been processed, the management server 500 determines whether or not there is at least one validation result exhibiting the illegality (Step S607).

In a case where it is determined that there is at least one validation result exhibiting the illegality, the management server 500 brings the processing to an end.

In a case where it is determined that there is no validation result exhibiting the illegality, the management server 500 selects the configuration item within the target tenant pattern (Step S611). It should be noted that the configuration item that has been selected once is removed from selection targets.

Specifically, the management server 500 refers to the configuration item 52804 within the tenant pattern information 528 to select the configuration item to be processed.

The management server 500 determines whether or not the validation rule is applied to the selected configuration item (Step S612). Specifically, the following processing is executed.

The management server 500 refers to the tenant pattern information 528 to determine whether or not the identifier is stored in the pattern parts ID 52807 of the entry corresponding to the selected configuration item 52804.

In a case where the identifier is not stored in the pattern parts ID 52807, the management server 500 determines that the validation rule is not applied to the selected configuration item.

In a case where the identifier is stored in the pattern parts ID 52807, the management server 500 refers to the validation rule information 5251 to search for the entry whose validation target 52514 matches the pattern parts ID 52807.

In a case where there is no entry whose validation target 52514 matches the pattern parts ID 52807, the management server 500 determines that the validation rule is not applied to the selected configuration item. On the other hand, in a case where the entry whose validation target 52514 matches the pattern parts ID 52807 exists, the management server 500 determines that the validation rule is applied to the selected configuration item.

The processing of Step S612 has been described above.

In a case where it is determined that the validation rule is not applied to the selected configuration item, the management server 500 advances to Step S620.

In a case where it is determined that the validation rule is applied to the selected configuration item, the management server 500 determines the kind of the applied validation rule (Step S613).

In a case where the kind of the applied validation rule is the validation rule "upper limit of the number of instances", the management server 500 determines whether or not a value K obtained by adding "1" to the current number of instances is equal to or smaller than the value stored in the upper limit value 52808 of the number of instances of the entry corresponding to the selected configuration item (Step S614).

It should be noted that the upper limit value 52808 of the number of instances is determined in Step S409.

In a case where it is determined that the value K is equal to or smaller than the value stored in the upper limit value 52808 of the number of instances, the management server 500 advances to Step S620.

In a case where it is determined that the value K is larger than the upper limit value 52808 of the number of instances, the management server 500 notifies the tenant administrator of the validation result exhibiting the illegality (Step S615).

With regard to the number of instances, there is often a case where the tenant administrator who manages only one tenant cannot handle the situation, and hence the fact that the upper limit value of the number of instances has been reached and a suggested measure such as "consult DC administrator" are presented as notification details for the tenant administrator.

The management server 500 notifies the DC administrator of the validation result exhibiting the illegality and the suggested correction (Step S616), and advances to Step S620. As the suggested correction to be notified, for example, the suggested correction such as expansion of a device based on the validation rule information 5251 is conceivable.

In a case where the kind of the validation rule to be applied is the validation rule "composition assumption" in Step S613, the management server 500 executes a check command for the NW device in order to determine whether or not a composition assumption is set (Step S617). Specifically, the following processing is executed.

The management server 500 refers to the validation rule detail information (composition assumption) 5253 based on the validation rule ID 52511 of the entry of the validation rule information 5251 retrieved in Step S612, to search for the entry that matches the validation rule ID 52511.

The management server 500 obtains the check command 52533 of the retrieved entry, and executes the check command for the NW device included in the network system in which the tenant is formed.

The management server 500 determines whether or not the execution result of the check command output from the NW device includes the string that matches the response string 52534 (Step S618).

In a case where it is determined that the execution result of the check command includes the string that matches the response string 52534, the management server 500 advances to Step S620.

In a case where it is determined that the execution result of the check command does not include the string that matches the response string 52534, the management server 500 notifies the DC administrator of the validation result exhibiting the illegality and the suggested correction (Step S619), and advances to Step S620. As the suggested correction to be notified, presentation of information for prompting the DC administrator to set the necessary configuration item based on the validation rule information 5251 is conceivable.

The management server 500 substitutes the parameter into the command template for the addition of the selected configuration item to generate the configuration detail of the configuration item (Step S620). Specifically, the following processing is executed.

The management server 500 obtains the identifier of the command template for the addition from the command template 52813 of the entry corresponding to the selected configuration item 52804. The management server 500 refers to the command template information 532 to search for the entry whose ID 5321 matches the identifier of the obtained command template for the addition.

The management server 500 obtains the command template for the addition from the command template 5323 of the retrieved entry. The management server 500 substitutes the parameter determined based on the determination method 52810 into the obtained command template for the addition to generate the configuration detail of the configuration item.

The processing of Step S620 has been described above.

The management server 500 determines whether or not all the configuration items have been processed (Step S621).

In a case where it is determined that not all the configuration items have been processed, the management server 500 returns to Step S611.

In a case where it is determined that all the configuration items have been processed, the management server 500 brings the processing to an end.

As described above, according to the embodiment, it is possible to validate the tenant pattern used for the network design for the tenant and the configuration detail of the tenant in the network system to which the NW device and a physical computer are coupled.

According to the one embodiment, the operator can easily generate the tenant pattern by using the pattern parts. Further, the validation is performed for the composition of the tenant pattern based on the validation rule at the time of the generation of the tenant pattern, which allows the operator to generate the tenant pattern having a proper configuration detail. Therefore, it is possible to reduce a work error in design and configuration by using the proper tenant pattern to design the tenant under an operation phase for the DC.

Further, the management server 500 can easily generate the pattern parts and the validation rule by supporting the generation of the pattern parts and the validation rule. In addition, it is possible to realize an increase in efficiency and quality of the network design by sharing the pattern parts and the validation rule.

It should be noted that various kinds of software exemplified in the embodiment can be stored in various recording media (for example, non-transitory storage medium) of an electromagnetic type, an electronic type, an optical type, and other such type, and can be downloaded onto the computer through a communication network such as the Internet. In the embodiment, the example of using the control in a software manner is described, but it is also possible to realize a part thereof in a hardware manner.

Further, the embodiment is described on the assumption that the management server 500 executes various kinds of processing. However, for example, the NW device 100 and the physical server 200 may have a function provided to the management server 500. In this case, the respective functional units may be arranged so as to be distributed to a plurality of NW devices 100 and a plurality of physical servers 200.

Although the present disclosure has been described with reference to example embodiments, those skilled in the art will recognize that various changes and modifications may be made in form and detail without departing from the spirit and scope of the claimed subject matter.

What is claimed is:

1. A management server, which is coupled to a computer system including a plurality of computers, and which manages a tenant pattern being information for forming a tenant being an application system for executing a predetermined application by using computer resources within the computer system,
    the tenant pattern including:
        a configuration item including a parameter necessary for generation of the tenant and a determination method for a value of the parameter; and
        an ID pool for storing the value assigned to the parameter at a time of the generation of the tenant,
    the management server comprising:
    a processor;
    a memory coupled to the processor; and
    a network interface coupled to the processor,
    the management server having:
    first pattern parts information for managing the configuration item as a pattern part that forms the tenant pattern;
    validation rule information for storing a detail of validation processing for a composition of the tenant pattern generated by using at least one the pattern part; and
    tenant pattern information for storing the composition of the tenant pattern generated by using the at least one the pattern part,
    the management server further comprising:
    a tenant pattern generation unit for generating the tenant pattern by using the pattern part;
    a tenant designing unit for designing a composition of the tenant by using the tenant pattern, and generating a configuration detail for actually building the tenant on the computer system based on the designed composition of the tenant; and
    a validation execution unit for executing the validation processing for one of the tenant pattern and the configuration detail based on the validation rule information.

2. The management server according to claim 1, wherein:
    the management server further has second pattern parts information for managing the ID pool as the pattern part;
    the validation rule information includes first validation rule information obtained by associating a first target parameter in the validation processing with a first parameter value range that is assumable by the first target parameter for each type of the plurality of computers used when generating the tenant; and the validation execution unit is configured to:

identify a second parameter value range that is assumable by the first target parameter in the tenant pattern based on the first validation rule information, the first pattern parts information, and the second pattern parts information;

identify the computer for which the first target parameter is set, and select the first parameter value range corresponding to the type of the identified computer;

determine whether the first parameter value range includes the second parameter value range; and notify of the fact that the tenant pattern is illegal and a suggested correction generated based on the first validation rule information, in a case where it is determined that the first parameter value range does not include the second parameter value range.

3. The management server according to claim 1, wherein:

the validation rule information includes second validation rule information obtained by associating a second target parameter in the validation processing with a type of another parameter referred to by the second target parameter; and the validation execution unit is configured to:

identify the type of the another parameter referred to by the second target parameter based on the second validation rule information and the tenant pattern information;

determine whether the type of the another parameter referred to by the second target parameter included in the second validation rule information matches the identified type of the another parameter; and notify of the fact that the tenant pattern is illegal and a suggested correction generated based on the second validation rule information, in a case where it is determined that the type of the another parameter referred to by the second target parameter included in the second validation rule information does not match the identified type of the another parameter.

4. The management server according to claim 3, wherein the validation execution unit is configured to:

extract the parameter whose type is the same as the type of the another parameter referred to by the second target parameter included in the second validation rule information based on the tenant pattern information, in a case where the pattern part including the second target parameter is added to the tenant pattern being generated; and notify of the extracted parameter as a candidate for the another parameter referred to by the second target parameter.

5. The management server according to claim 1, wherein:

the validation rule information includes third validation rule information for defining a configuration order of a plurality of configuration items; and the validation execution unit is configured to:

determine, after the tenant pattern is generated, whether the configuration order of a plurality of target configuration items included in the generated tenant pattern is proper based on the third validation rule information and the tenant pattern information; and notify of the fact that the tenant pattern is illegal and a suggested correction generated based on the third validation rule information, in a case where it is determined that the configuration order of the plurality of target configuration items included in the generated tenant pattern is wrong.

6. The management server according to claim 1, wherein:

the management server further has tenant instance information for storing information relating to an instance of the tenant generated based on the configuration detail generated by using the tenant pattern;

the validation rule information includes fourth validation rule information obtained by associating a first target configuration item in the validation processing with an upper limit value of a number of instances in the first target configuration item; and the validation execution unit is configured to:

refer to the tenant instance information when the tenant is generated by using the tenant pattern to determine whether or not the number of instances of the first target configuration item becomes larger than the upper limit value of the number of instances in the first target configuration item in a case where the tenant has been generated; and notify of the fact that the tenant is illegal and a suggested correction generated based on the fourth validation rule information, in a case where it is determined that the number of instances of the first target configuration item is larger than the upper limit value of the number of instances in the first target configuration item.

7. The management server according to claim 6, wherein:

the fourth validation rule information includes the upper limit value of the number of instances in the first target configuration item for each performance requirement for the computer;

the tenant pattern generation unit determines the upper limit value of the number of instances in the first target configuration item from the fourth validation rule information based on the performance requirement required by the tenant pattern to be generated, in a case where the tenant pattern is generated by using the pattern part including the first target configuration item; and the validation execution unit determines whether the number of instances of the first target configuration item becomes larger than the determined upper limit value of the number of instances of the first target configuration item, in a case where the tenant pattern is generated by using the generated tenant pattern.

8. The management server according to claim 1, wherein:

the validation rule information includes fifth validation rule information for storing a correspondence relationship between a second target configuration item in the validation processing and another configuration item necessary to set the second target configuration item; and the validation execution unit is configured to:

identify the computer for which the second target configuration item is set when the tenant is generated by using the tenant pattern;

determine whether the another configuration item necessary to set the second target configuration item is set for the identified computer; and notify of the fact that the tenant pattern is illegal and a suggested correction generated based on the fifth validation rule information in a case where it is determined that the another configuration item necessary to set the second target configuration item is not set for the identified computer.

9. The management server according to claim 3, further comprising a validation rule generation unit for generating the validation rule information,
wherein the validation rule generation unit is configured to:
refer to the tenant pattern information to select the configuration item to be a target;
identify the parameter that refers to the another parameter from among the parameters included in the selected configuration item; and
generate the second validation rule information based on the identified parameter and the another parameter referred to by the identified parameter.

10. The management server according to claim 6, wherein:
the management server further has extraction string information being information on a string for generating the validation rule information from a manual for the computer;
the management server further comprises a validation rule generation unit for generating the validation rule information; and
the validation rule generation unit is configured to:
extract one of: a parameter value range that is assumable by a predetermined parameter for each model of the computer; and the upper limit value of the number of instances in a predetermined configuration item, from the input manual based on the extraction string information; and
perform one of: generation of the first validation rule information based on the extracted parameter value range that is assumable by the predetermined parameter for each model of the computer; and generation of the fourth validation rule information based on the extracted upper limit value of the number of instances in the predetermined configuration item.

11. The management server according to claim 6, wherein:
the management server is further coupled to a computer for validation for obtaining a performance requirement;
the management server further has performance requirement check scenario information including a performance check command for the computer and a string for obtaining performance information from a response to the performance check command;
the management server further includes a validation rule generation unit for generating the validation rule information; and
the validation rule generation unit is configured to:
select a combination of the configuration items for checking the performance requirement from a input list of a plurality of configuration items;
check the performance requirement required by the computer for validation based on the performance requirement check scenario information; and
generate the fourth validation rule information based on the combination of the configuration items and the checked performance requirement.

12. A tenant pattern validation method executed a management server, which is coupled to a computer system including a plurality of computers, for managing a tenant pattern being information for forming a tenant being an application system for executing a predetermined application by using computer resources within the computer system,
the tenant pattern including:
a configuration item including a parameter necessary for generation of the tenant and a determination method for a value of the parameter; and
an ID pool for storing the value assigned to the parameter when generating the tenant,
the management server including:
a processor;
a memory coupled to the processor; and
a network interface coupled to the processor,
the management server having:
first pattern parts information for managing the configuration item as a pattern part that forms the tenant pattern;
validation rule information for storing a detail of validation processing for a composition of the tenant pattern generated by using at least one the pattern part; and
tenant pattern information for storing the composition of the tenant pattern generated by using the pattern part,
the tenant pattern validation method including:
a first step of generating, by the management server, the tenant pattern by using the at least one the pattern part;
a second step of designing, by the management server, a composition of the tenant by using the tenant pattern, and generating a configuration detail for actually building the tenant on the computer system based on the designed composition of the tenant; and
a third step of executing, by the management server, the validation processing for one of the tenant pattern and the configuration detail based on the validation rule information.

13. The tenant pattern validation method according to claim 12, wherein:
the management server further has second pattern parts information for managing the ID pool as the pattern part;
the validation rule information includes first validation rule information obtained by associating a first target parameter in the validation processing with a first parameter value range that is assumable by the first target parameter for each type of the plurality of computers used when generating the tenant; and
the third step includes:
identifying a second parameter value range that is assumable by the first target parameter in the tenant pattern based on the first validation rule information, the first pattern parts information, and the second pattern parts information;
identifying the computer for which the first target parameter is set, and selecting the first parameter value range corresponding to the type of the identified computer;
determining whether the first parameter value range includes the second parameter value range; and
notifying of the fact that the tenant pattern is illegal and a suggested correction generated based on the first validation rule information, in a case where it is determined that the first parameter value range does not include the second parameter value range.

14. The tenant pattern validation method according to claim 12, wherein:
the validation rule information includes second validation rule information obtained by associating a second target parameter in the validation processing with a type of another parameter referred to by the second target parameter; and
the third step includes:
identifying the type of the another parameter referred to by the second target parameter based on the second validation rule information and the tenant pattern information;
determining whether the type of the another parameter referred to by the second target parameter included in the second validation rule information matches the identified type of the another parameter; and
notifying of the fact that the tenant pattern is illegal and a suggested correction generated based on the second validation rule information, in a case where it is determined that the type of the another parameter referred to by the second target parameter included in the second validation rule information does not match the identified type of the another parameter.

15. The tenant pattern validation method according to claim 14, wherein the third step includes:
extracting the parameter whose type is the same as the type of the another parameter referred to by the second target parameter included in the second validation rule information based on the tenant pattern information, in a case where the pattern part including the second target parameter is added to the tenant pattern being generated; and
notifying of the extracted parameter as a candidate for the another parameter referred to by the second target parameter.

16. The tenant pattern validation method according to claim 12, wherein:
the validation rule information includes third validation rule information for defining a configuration order of a plurality of configuration items; and
the third step includes:
determining, after the tenant pattern is generated, whether the configuration order of a plurality of target configuration items included in the generated tenant pattern is proper based on the third validation rule information and the tenant pattern information; and
notifying of the fact that the tenant pattern is illegal and a suggested correction generated based on the third validation rule information, in a case where it is determined that the configuration order of the plurality of target configuration items included in the generated tenant pattern is wrong.

17. The tenant pattern validation method according to claim 12, wherein:
the management server further has tenant instance information for storing information relating to an instance of the tenant generated based on the configuration detail generated by using the tenant pattern;
the validation rule information includes fourth validation rule information obtained by associating a first target configuration item in the validation processing with an upper limit value of a number of instances in the first target configuration item; and
the third step includes:
referring to the tenant instance information when the tenant is generated by using the tenant pattern to determine whether or not the number of instances of the first target configuration item becomes larger than the upper limit value of the number of instances in the first target configuration item in a case where the tenant has been generated; and
notifying of the fact that the tenant is illegal and a suggested correction generated based on the fourth validation rule information, in a case where it is determined that the number of instances of the first target configuration item is larger than the upper limit value of the number of instances in the first target configuration item.

18. The tenant pattern validation method according to claim 17, wherein:
the fourth validation rule information includes the upper limit value of the number of instances in the first target configuration item for each performance requirement for the computer;
the first step includes determining the upper limit value of the number of instances in the first target configuration item from the fourth validation rule information based on the performance requirement required by the tenant pattern to be generated, in a case where the tenant pattern is generated by using the pattern part including the first target configuration item; and
the third step includes determining whether or not the number of instances of the first target configuration item becomes larger than the determined upper limit value of the number of instances of the first target configuration item, in a case where the tenant pattern is generated by using the generated tenant pattern.

19. The tenant pattern validation method according to claim 12, wherein:
the validation rule information includes fifth validation rule information for storing a correspondence relationship between a second target configuration item in the validation processing and another configuration item necessary to set the second target configuration item; and
the third step includes:
identifying the computer including the second target configuration item, in a case where the tenant is generated by using the tenant pattern;
determining whether the another configuration item necessary to set the second target configuration item is set for the identified computer; and
notifying of the fact that the tenant pattern is illegal and a suggested correction generated based on the fifth validation rule information, in a case where it is determined that the another configuration item necessary to set the second target configuration item is not set for the identified computer.

20. A computer system, comprising a plurality of computers, for managing a tenant pattern being information used for forming a tenant being an application system for executing a predetermined application by using computer resources of the plurality of computers,
the plurality of computers each including:
a processor;
a memory coupled to the processor; and
a network interface coupled to the processor,
the tenant pattern including:
a configuration item including a parameter necessary for generation of the tenant and a determination method for a value of the parameter; and
an ID pool for storing the value assigned to the parameter when generating the tenant,
the computer system further comprising:
a pattern parts information storage unit for managing the configuration item as a pattern part that forms the tenant pattern;
a validation rule information storage unit for storing a detail of validation processing for a composition of the tenant pattern generated by using at least one the pattern part;
a tenant pattern information storage unit for storing the composition of the tenant pattern generated by using the at least one the pattern part;
a tenant pattern generation unit for generating the tenant pattern by using the pattern part;
a tenant designing unit for designing a composition of the tenant by using the tenant pattern, and generating a configuration detail for actually building the tenant on the computer system based on the designed composition of the tenant; and a validation execution unit for executing the validation processing for one of the tenant pattern and the configuration detail based on validation rule information.

* * * * *